United States Patent
Suga

(10) Patent No.: US 7,929,503 B2
(45) Date of Patent: Apr. 19, 2011

(54) WIRELESS TERMINAL, MANAGEMENT APPARATUS AND WIRELESS LAN CONTROL METHOD

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 11/289,513

(22) Filed: Nov. 30, 2005

(65) Prior Publication Data
US 2007/0047480 A1    Mar. 1, 2007

(30) Foreign Application Priority Data
Aug. 30, 2005    (JP) .................................. 2005-250362

(51) Int. Cl.
*H04Q 7/24* (2006.01)

(52) U.S. Cl. ............... 370/338; 370/328; 455/67.11; 455/226.2; 455/552.1; 455/556.1

(58) Field of Classification Search .................. 370/338, 370/328, 252; 455/67.11, 226.2, 552.1, 556.1
See application file for complete search history.

(56) References Cited

U.S. PATENT DOCUMENTS

| | | | |
|---|---|---|---|
| 7,510,113 B2 | 3/2009 | Igarashi et al. | |
| 7,734,255 B2 | 6/2010 | Matsunaga | |
| 2004/0063458 A1* | 4/2004 | Hori et al. | 455/554.2 |
| 2004/0156399 A1* | 8/2004 | Eran | 370/913 |
| 2005/0058112 A1* | 3/2005 | Lahey et al. | 370/338 |
| 2005/0068928 A1* | 3/2005 | Smith et al. | 370/338 |
| 2005/0138178 A1* | 6/2005 | Astarabadi | 709/227 |
| 2006/0191000 A1* | 8/2006 | O'Hara et al. | 726/12 |
| 2007/0049323 A1* | 3/2007 | Wang et al. | 455/525 |
| 2007/0091845 A1* | 4/2007 | Brideglall | 370/331 |

FOREIGN PATENT DOCUMENTS

| | | |
|---|---|---|
| JP | 06-261043 | 9/1994 |
| JP | 10-041969 | 2/1998 |
| JP | 10-070540 A | 3/1998 |
| JP | 2003-338829 A | 11/2003 |
| JP | 2004-207840 A | 7/2004 |
| JP | 2005-117357 | 4/2005 |

OTHER PUBLICATIONS

"Japanese Office Action" mailed by JPO and corresponding to Japanese application No. 2005-250362 on Sep. 21, 2010, with English translation.

* cited by examiner

*Primary Examiner* — Temica M Beamer
(74) *Attorney, Agent, or Firm* — Fujitsu Patent Center

(57) ABSTRACT

The present invention provides a wireless terminal for constituting a wireless local area network together with a plurality of access points and a management apparatus that manages the access points and carries out a wireless telecommunication with the access points, comprising an access point notification unit for transmitting connection request information, which includes identifier information about a plurality of the access points recognized as communicable and radio wave information about the wireless telecommunication with each of the access points, to the management apparatus by way of one of the access points.

17 Claims, 21 Drawing Sheets

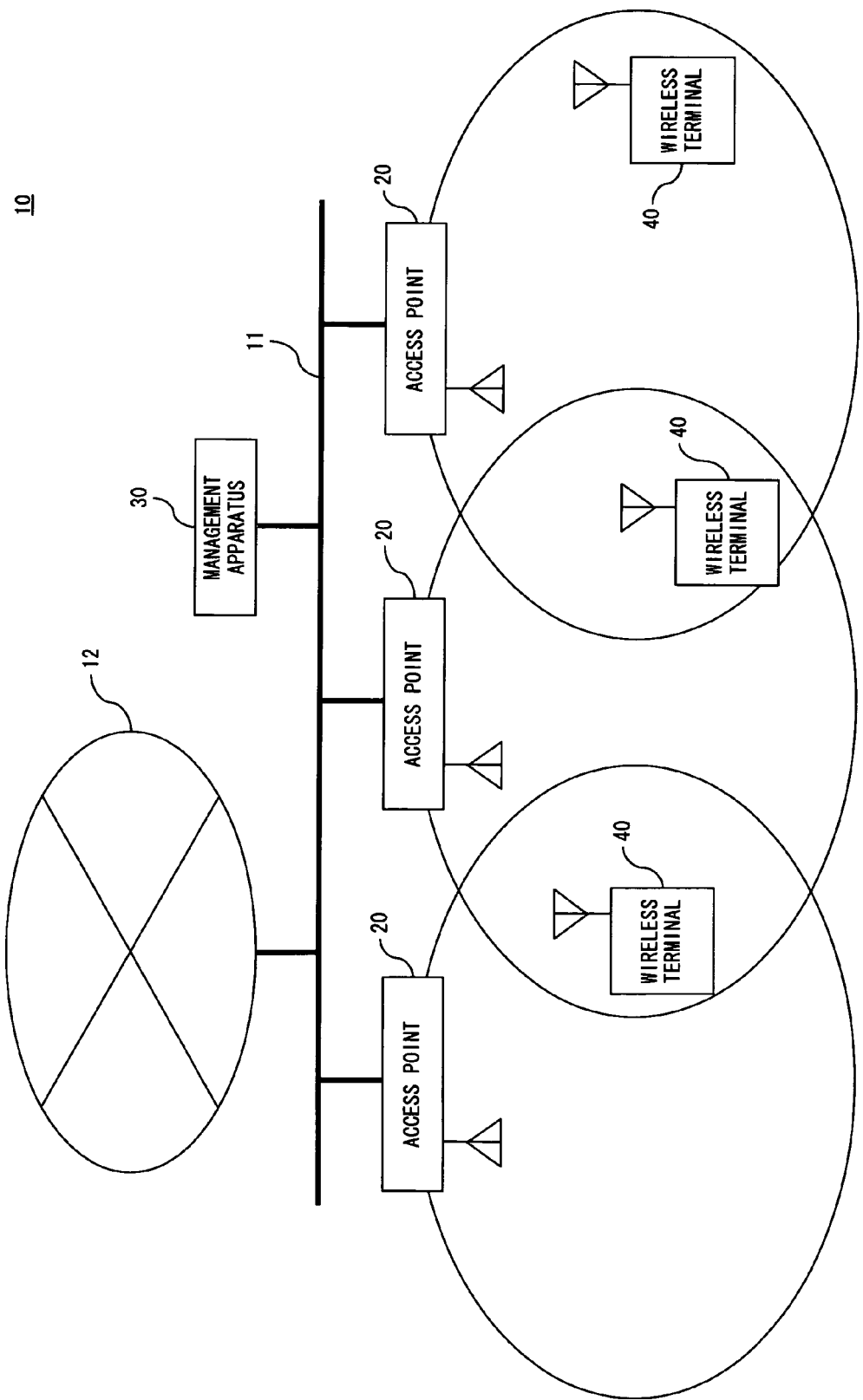
F I G. 1

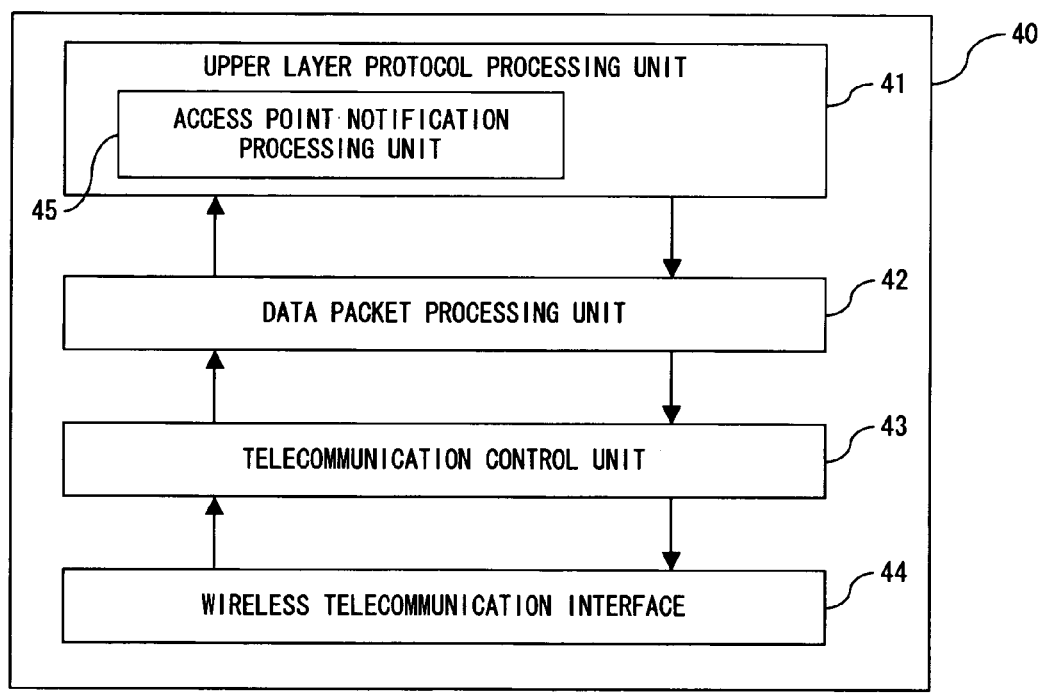
F I G. 4

| | 35a | 35b | 35c | 35d | 35e | 35f |
|---|---|---|---|---|---|---|
| | Index | BSSID | IP ADDRESS | CHANNEL | THE NUMBER OF CONNECTED TERMINALS | THE NUMBER OF CONNECTABLE TERMINALS |
| | 1 | MAC1 | IP1 | 1 | 3 | 7 |
| | 2 | MAC2 | IP2 | 4 | 2 | 8 |
| | 3 | MAC3 | IP3 | 9 | 5 | 5 |

F I G. 7

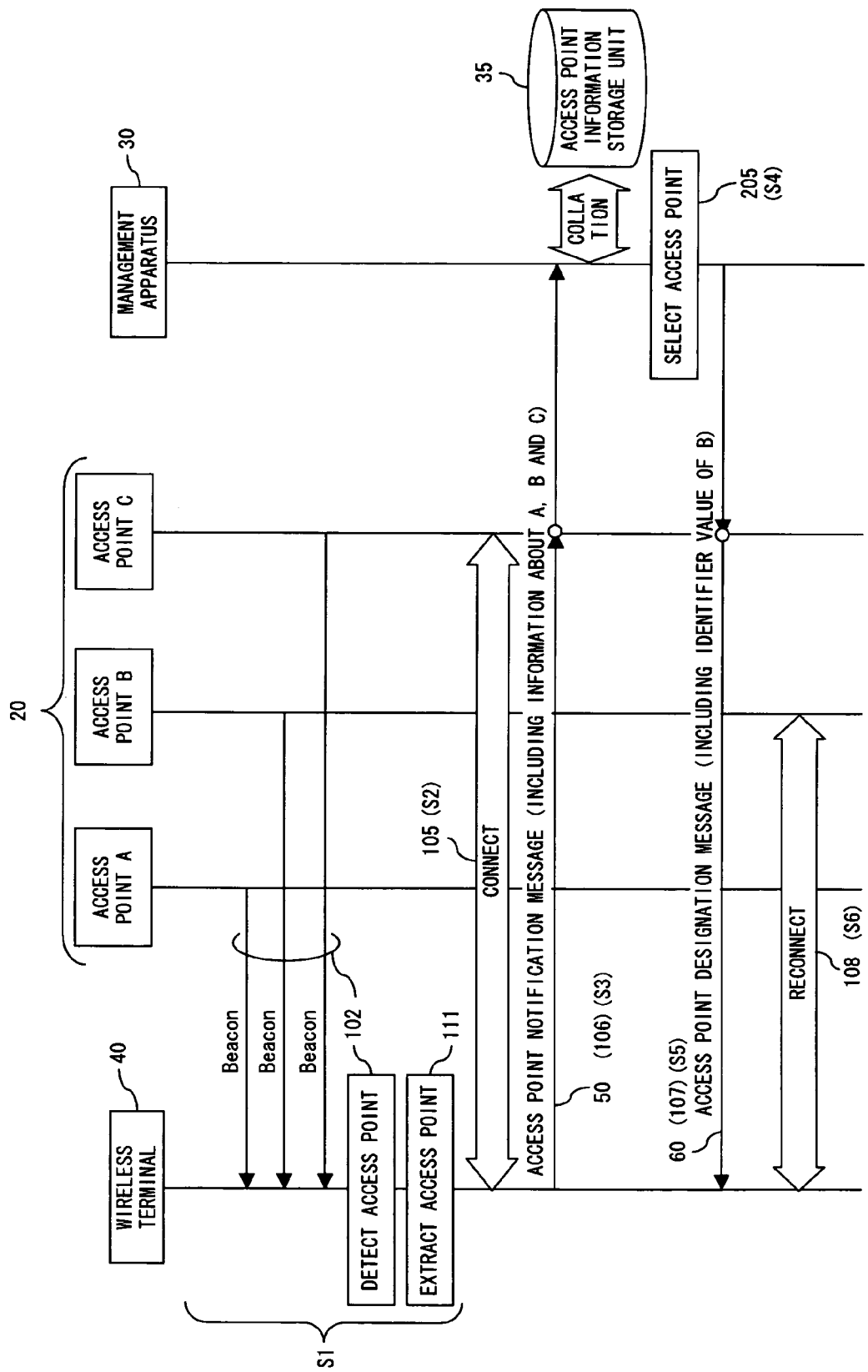
F I G. 9

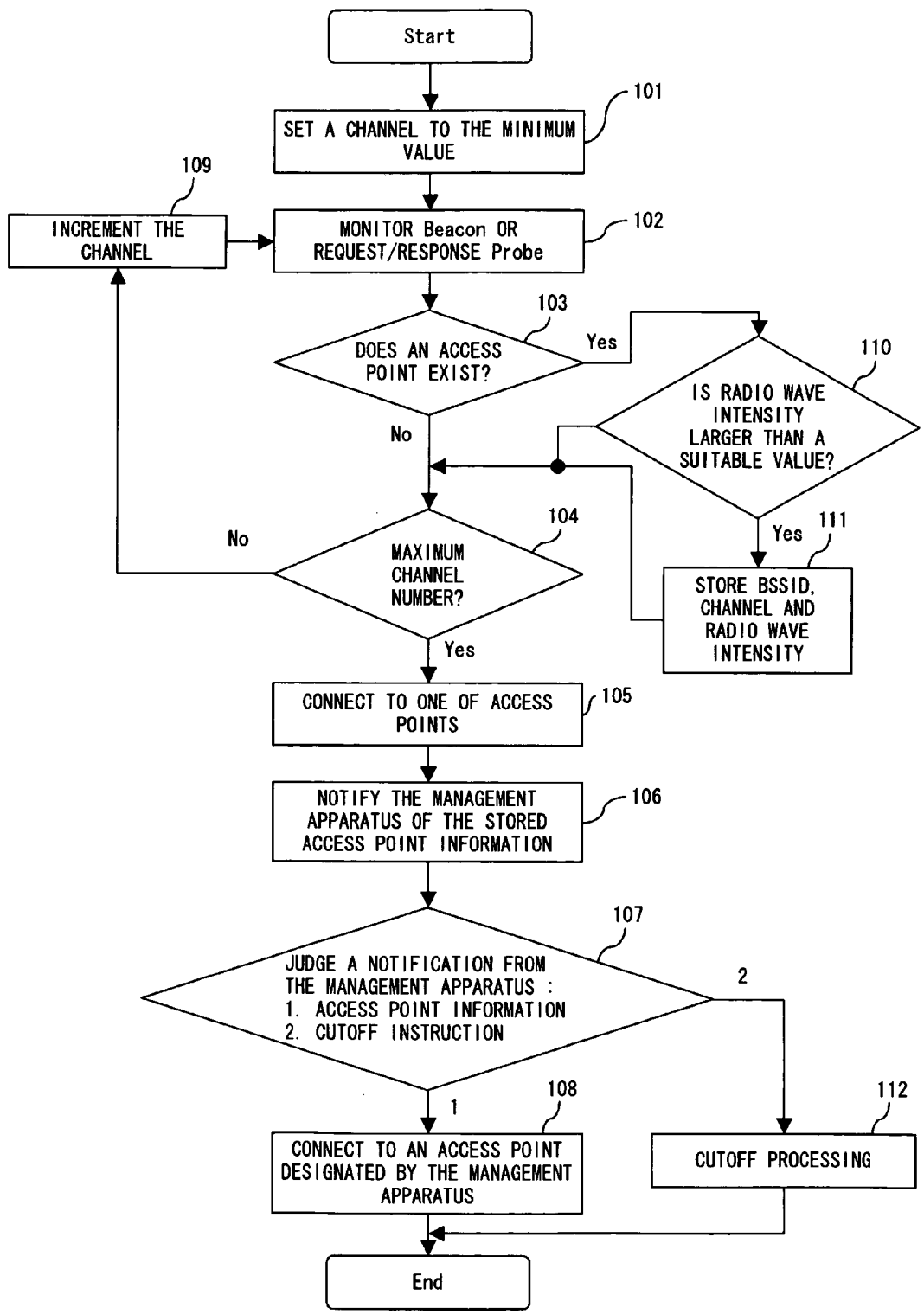
F I G. 1 0

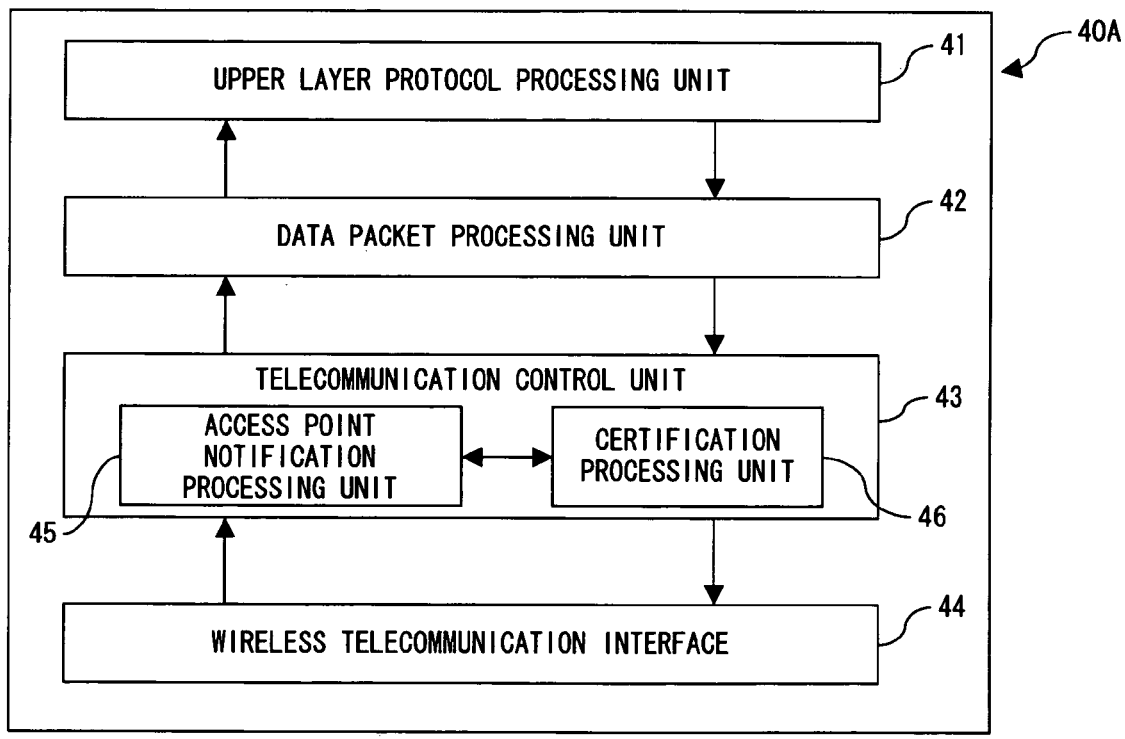
F I G. 15

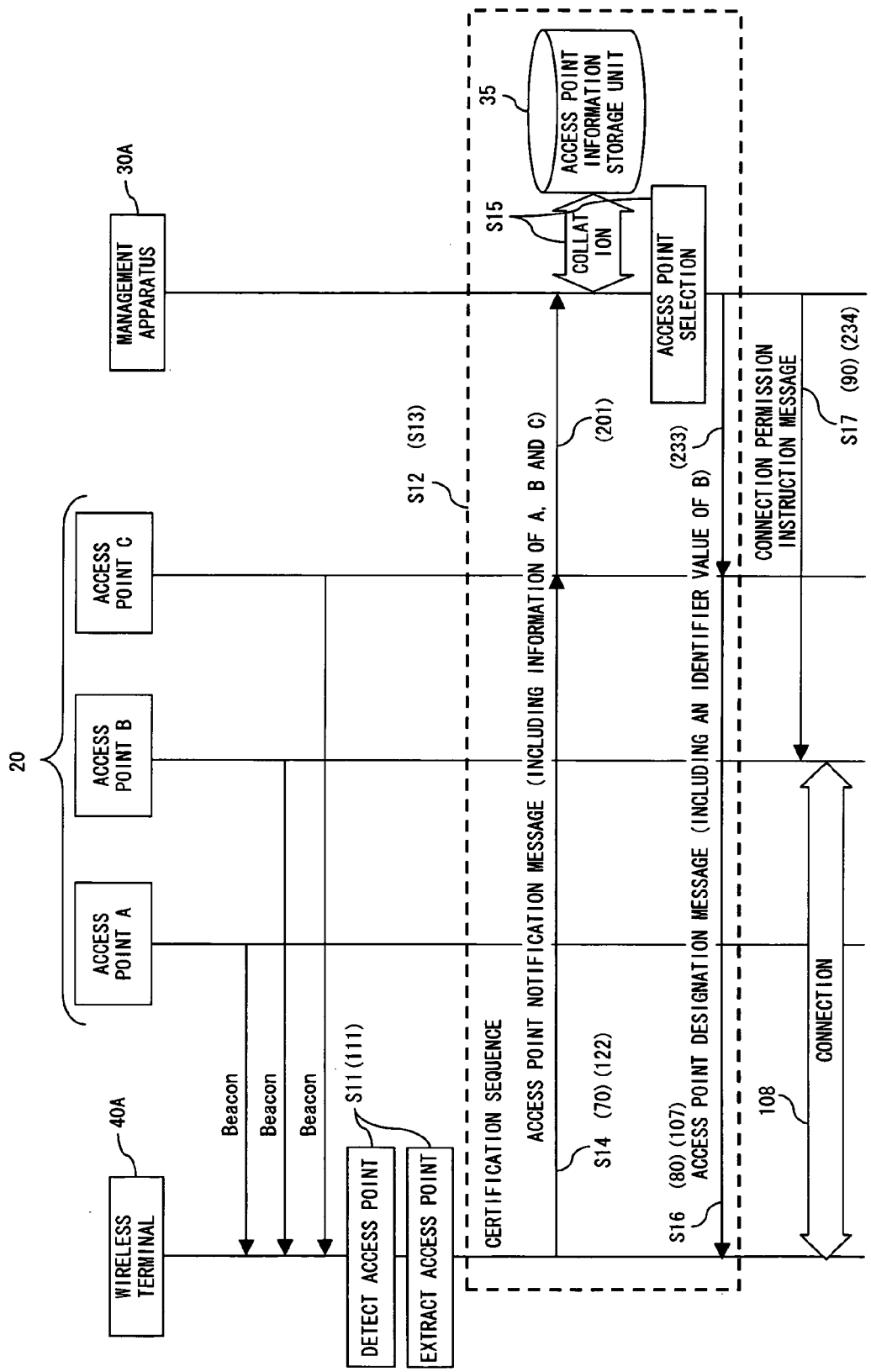
F I G. 19

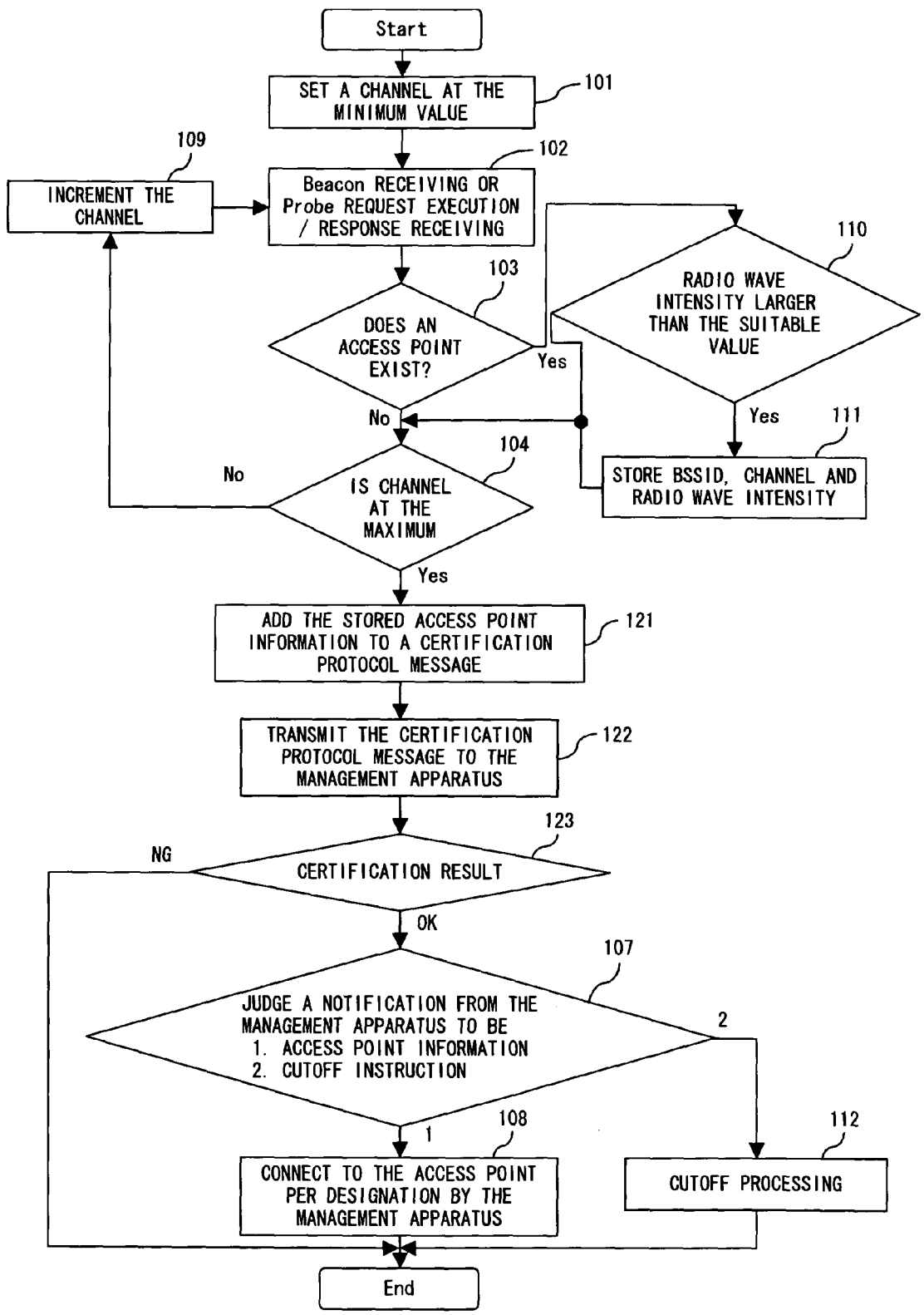
F I G. 20

WIRELESS TERMINAL, MANAGEMENT APPARATUS AND WIRELESS LAN CONTROL METHOD

BACKGROUND OF THE INVENTION

1. Field of the Invention

The present invention relates to a wireless LAN technique, and in particular to an effective technique applicable to a wireless terminal, wireless base station (i.e., an access point), management apparatus and the related control method, et cetera.

2. Description of the Related Art

In recent years, the wireless LAN has become increasingly popularized eliminating the need for a cable, in addition to the conventional fixed line LAN (local area network), as a telecommunication medium for information systems in the enterprise. A public wireless LAN service has also emerged allowing the Internet connections in a neighboring area of the location where telecommunication equipment, so called wireless base stations (i.e., access points), are installed in public spaces such as train stations, airports, hotels and coffee shops.

Enterprise and public wireless LAN systems provide respective telecommunication services over a wide range by installing a plurality of access points, because radio waves from a single access point have a limited usage range. And such a wireless LAN system is based on a common SSID (service set ID), which identifies the wireless LAN network, for all access points so as to enable a user to use all the access points of the wireless LAN system by registering one SSID in the wireless terminal.

Conventionally, a wireless terminal connects to an access point with the highest radio wave intensity from among the access points detected by a scanning, et cetera, when utilizing the above described wireless LAN system.

When using a wireless LAN system in a place where many users gather, such as a conference room, however, the connections concentrate on a single access point since the radio wave conditions received by wireless terminals are approximately the same, thus creating a problem of degrading the telecommunication quality received by all the wireless terminals connected to the access point.

As a countermeasure to the above described problem, a patent document 1 has disclosed a technique whereby a management terminal is installed for managing all the access points in a wireless LAN system so that the management terminal determines an access point for a wireless terminal to connect to. That is, the wireless terminal sends out a connection request signal to all the recognized access points when using a wireless LAN system so that the received access points transmit the connection request signal including their respective radio wave levels to a management terminal. The management terminal then determines an access point as a connection destination for the wireless terminal based on the number of wireless terminals being connected to each access point and the information about the message contained in the transmitted connection request, thereby avoiding concentrated connection to the access point.

The technique disclosed by the patent document 1, however, is faced with a technical problem of wasting wireless resources unnecessarily since each wireless terminal transmits a connection request signal to all the recognized access points.

There is also another technical problem that the management terminal cannot judge how many access points are recognized by the wireless terminal which has transmitted the connection request signal or to which access points the wireless terminal has transmitted the connection request signal, because the connection request signals transmitted to the respective access points are mutually independent, and therefore it takes time to determine an access point as the connection destination.

Meanwhile, a currently marketed wireless LAN switch has the function of distributing connections to one access point, as disclosed in a patent document 2. This function is for refusing a connection of a wireless terminal to a load concentrated access point and making the wireless terminal try to connect to another access point, thereby distributing a load on the access point. There is, however, a technical problem that a wireless terminal takes time to select a connectable access point.

Another patent document 3 has disclosed a technique for furnishing each access point with a wireless terminal certification-use database registering wireless terminal apparatuses which are permitted to join a wireless network and with a wireless terminal management-use database registering wireless terminal apparatuses which are currently under management and for furnishing wireless terminals with a management side recognition-use database, thereby accomplishing a retransmission from an access point to a wireless terminal on the MAC level and a restriction on a wireless terminal apparatus in joining each access point.

The case of the technique noted in the patent document 3, however, is configured to such that an access point has the above described various databases and therefore is faced with the technical problem that the work of installing, adding, moving, et cetera, each access point becomes cumbersome as compared to the case of managing a plurality of base stations integrally by a management apparatus, et cetera.

[Patent document 1] laid-open Japanese patent application publication No. 10-41969

[Patent document 2] laid-open Japanese patent application publication No. 2005-117357

[Patent document 3] laid-open Japanese patent application publication No. 06-261043

SUMMARY OF THE INVENTION

A purpose of the present invention is to avoid a concentrated connection of wireless terminals to a specific access point when the wireless terminals utilize a wireless LAN system.

Another purpose of the present invention is to determine an access point as a connection destination for a wireless terminal at high speed while limiting a consumption of wireless resources at the time of connecting a wireless terminal to a wireless LAN.

A first aspect of the present invention is to provide a wireless terminal for constituting a wireless local area network together with a plurality of access points and a management apparatus that manages the access points and for carrying out a wireless telecommunication with the access points, comprising:

an access point notification unit for transmitting connection request information, which includes identifier information about a plurality of the access points recognized as communicable and radio wave information about the wireless telecommunication with each of the access points, to the management apparatus by way of one of the access points.

A second aspect of the present invention is to provide a management apparatus for constituting a wireless local area network together with a plurality of access points that carries out a wireless telecommunication with a wireless terminal and managing which of the access points the wireless terminal is to be connected to, comprising:

a storage unit for storing access point information including identifier information about each of the access points and the number of the wireless terminals connectable to the applicable access point; and an access point determination unit for determining the access point that the wireless terminal is to be connected to, and notifying the aforementioned wireless terminal, based on connection request information including identifier information, coming from the wireless terminal by way of one of the access points, about a plurality of the access points recognized as communicable, and radio wave information about the wireless telecommunication between the aforementioned wireless terminal and the access point and the access point information retained by the storage unit.

A third aspect of the present invention is to provide a control method for a wireless local area network including a plurality of access points that carries out a wireless telecommunication with a wireless terminal and a management apparatus for managing which of the access points the wireless terminal is to be connected to, comprising:

a first step of transmitting, from each of the wireless terminals to the management apparatus by way of one of the access points, connection request information including identifier information about a plurality of the access points recognized by each of the aforementioned wireless terminals as communicable and radio wave information about the wireless telecommunication with each of the access points; and a second step of the management apparatus notifying a wireless terminal, which has issued the connection request information, of the access point that the aforementioned wireless terminal is to be connected to.

A fourth aspect of the present invention is to provide a wireless local area network system including a plurality of access points, a wireless terminal for carrying out a wireless telecommunication with the access points and a management apparatus for managing the access points, wherein the wireless terminal includes an access point notification unit for notifying the management apparatus of connection request information, which includes identifier information about each of a plurality of the access points recognized as the wireless telecommunication being available and radio wave information about the wireless telecommunication with the access points, by way of one of the access points; and the management apparatus includes an access point determination unit for designating, to a wireless terminal, the access point as the connection destination of the aforementioned wireless terminal, based on the connection request information coming from the wireless terminal.

The fifth aspect of the present invention is to provide a wireless local area network system including a plurality of access points, a wireless terminal for carrying out a wireless telecommunication with the access points and a management apparatus for managing the access points, wherein the wireless terminal includes a certification request unit for requesting the management apparatus for connecting to the wireless local area network system, and an access point notification unit for notifying the management apparatus by adding, to a certification protocol message as connection request information, identifier information about the access points recognized as being available for a wireless telecommunication and radio wave information about the wireless telecommunication with the access point; and the management apparatus includes a certification unit for certifying connection of the wireless terminal to the wireless local area network system, an access point determination unit for determining the access point as the connection destination of the wireless terminal from among the access points having the identifier information notified by the connection request information and designating the access point by using the certification protocol message if the connection certification is successful according to the certification unit, and a connection permission designation unit for designating a connection permission for the wireless terminal to the access point.

According to the above described present invention, the management apparatus for managing the access points within the wireless LAN system designates an access point that the wireless terminal is to be connected to, thereby making it possible to avoid a concentrated connection to a specific access point.

It is also possible to suppress a consumption of wireless resources in determining an access point as the connection destination for a wireless terminal by compiling information about a plurality of access points recognized by each wireless terminal as connection request information and notifying the management apparatus in a lump by way of one access point at the time of determining an access point as the connection destination for the wireless terminal.

Furthermore, the management apparatus is enabled to determine an access point as the connection destination by referring to information about all the access points available for a wireless terminal by receiving notification of time of connection request information from the aforementioned wireless terminal and therefore determine an access point as the connection destination for a wireless terminal speedily without a need to wait for a plurality of connection requests, which are coming in, one after another, from one wireless terminal by way of a plurality of access points, to queue up.

BRIEF DESCRIPTION OF THE DRAWINGS

FIG. 1 is a conceptual diagram showing a configuration example of a wireless LAN system as an embodiment of the present invention;

FIG. 4 is a conceptual diagram showing a configuration example of a wireless terminal constituting a wireless LAN system as an embodiment of the present invention;

FIG. 7 is a conceptual diagram showing a configuration example of information retained by an access point information storage unit comprised by a management apparatus as an embodiment of the present invention;

FIG. 9 is a sequence chart exemplifying a connection sequence in a wireless LAN system as an embodiment of the present invention;

FIG. 10 is a flow chart exemplifying an operation of a wireless terminal constituting a wireless LAN system as an embodiment of the present invention;

FIG. 15 is a conceptual diagram showing a configuration example of a wireless terminal constituting a wireless LAN system as another embodiment of the present invention;

FIG. 19 is a sequence chart exemplifying a connection sequence for a wireless terminal connecting to an access point in a wireless LAN system as another embodiment of the present invention;

FIG. 20 is a flow chart exemplifying an operation of a wireless terminal constituting a wireless LAN system as another embodiment of the present invention.

DESCRIPTION OF THE PREFERRED EMBODIMENTS

Figure 2:
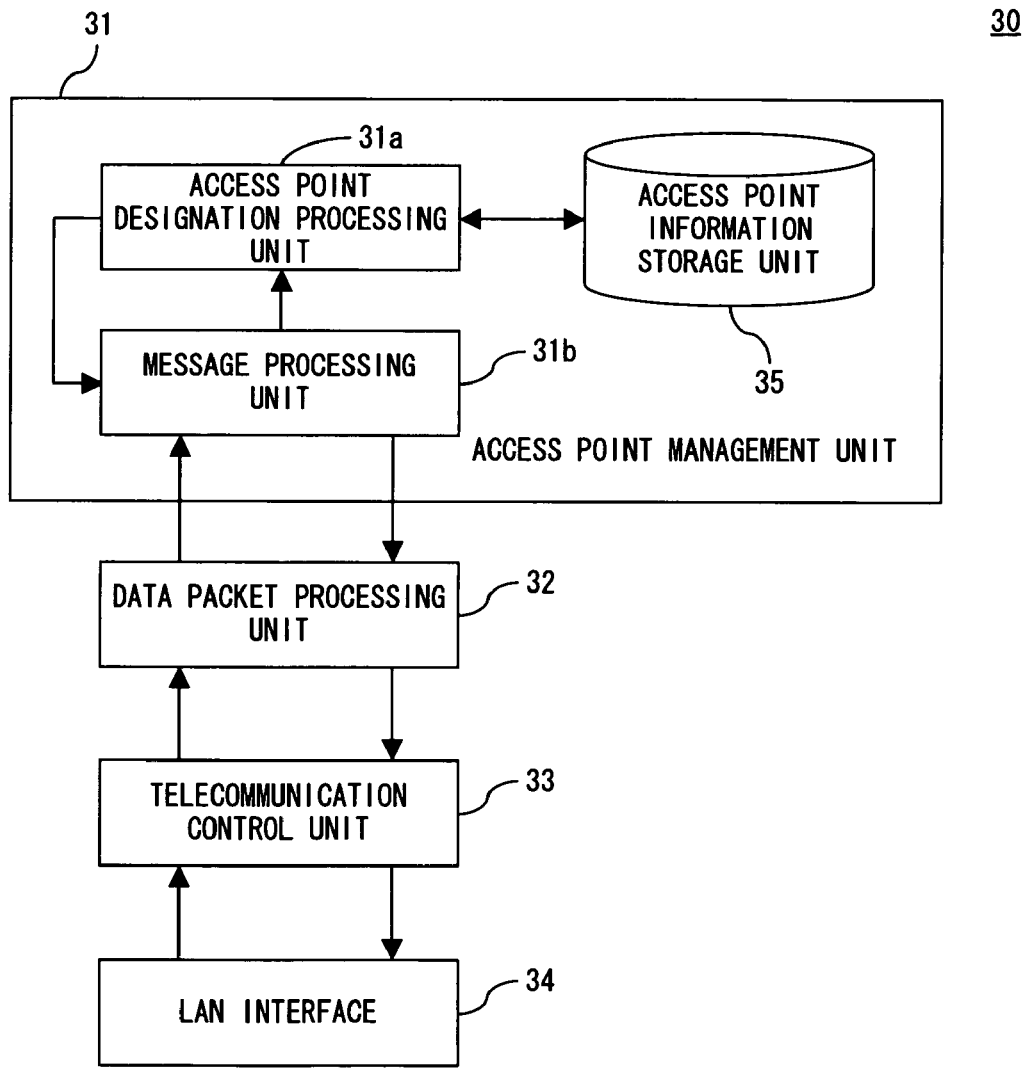
FIG. 2 is a conceptual diagram showing a configuration example of a management apparatus constituting a wireless LAN system as an embodiment of the present invention.

The following is a detailed description of the preferred embodiment of the present invention while referring to the accompanying drawings.

First Embodiment

As exemplified by FIG. 1, a wireless LAN system 10 includes a plurality of access points 20 connected by way of LAN cables 11 and a management apparatus 30 for managing the access points 20. One or a plurality of wireless terminals 40 positioning themselves within a range of the wireless telecommunication being available are connected to each of the access points 20.

As exemplified by FIG. 2, the management apparatus 30 according to the present embodiment includes an access point management unit 31, a data packet processing unit 32, a telecommunication control unit 33, a LAN interface 34 and an access point information storage unit 35.

The management apparatus 30 is comprised by a computer for example so that the access point management unit 31, data packet processing unit 32 and telecommunication control unit 33 can be accomplished by software and/or firmware which are executed by the computer. Alternatively, computer hardware can accomplish these functions.

The LAN interface 34 is accomplished by hardware and firmware such as a computer connected LAN card and carries out physical layer processing as in the OSI (open systems interconnect) reference model. The access point information storage unit 35 is accomplished by a nonvolatile rewritable storage apparatus.

The telecommunication control unit 33 carries out processing equivalent to the data link layer of the OSI reference model so as to operate a control of telecommunications among adjacent nodes.

The data packet processing unit 32 carries out processes equivalent to the network layer and transport layer of the OSI reference model, thereby controlling an assembly of telecommunication data and a data exchange with an upper layer application.

The access point management unit 31 is accomplished by an application program, and includes an access point designation processing unit 31a and a message processing unit 31b.

The message processing unit 31b performs a message processing at the application level. That is, the current embodiment is configured to carry out a receiving processing of a later described access point notification message 50 from a wireless terminal 40, and a transmission processing of an access point designation message 60.

The access point designation processing unit 31a carries out the processing of determining an access point 20 that a wireless terminal is to be connected to based on the information content of the access point notification message 50 obtained from the message processing unit 31b and information stored by the access point information storage unit 35, notifying the message processing unit 31b of the determination result and transmitting to the wireless terminal 40 as the access point designation message 60.

Figure 3:
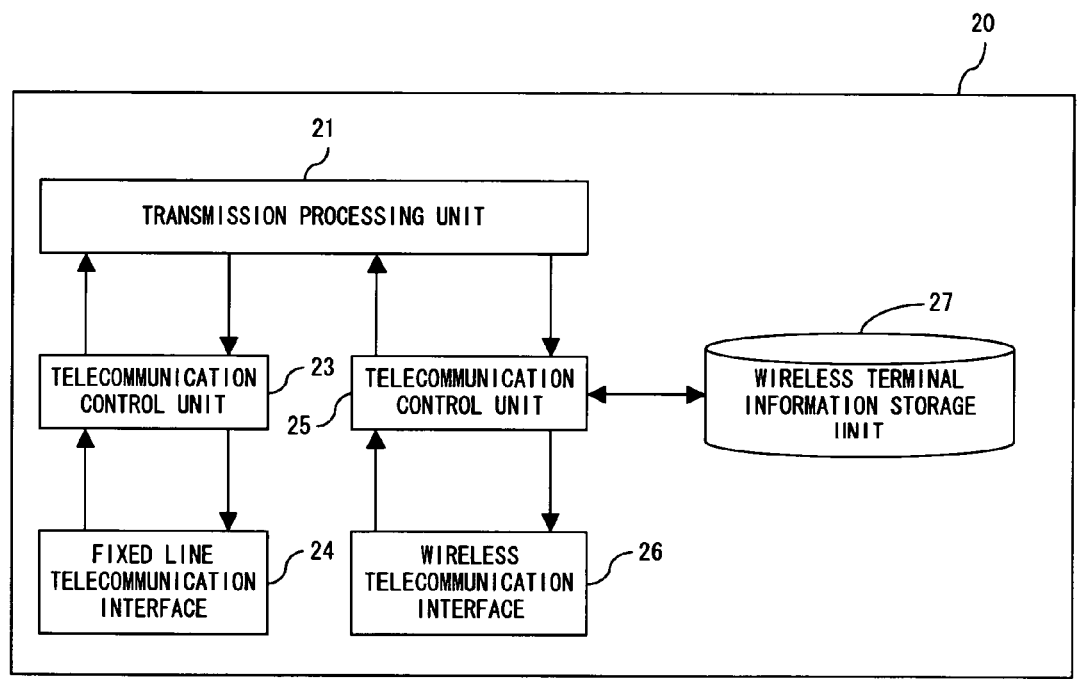
FIG. 3 is a conceptual diagram showing a configuration example of an access point constituting a wireless LAN system as an embodiment of the present invention.

As exemplified by FIG. 3, each of the access points 20 according to the present embodiment includes a transmission processing unit 21, a telecommunication control unit 23, a fixed line telecommunication interface 24, a telecommunication control unit 25, a wireless telecommunication interface 26 and a wireless terminal information storage unit 27.

Each of the units of the access point 20 can be accomplished by software or firmware executed by a computer or by computer hardware.

The fixed line telecommunication interface 24 is comprised by hardware such as a LAN card for instance and accomplishes a connection to the LAN cable 11 by carrying out processing of the physical layer of the OSI reference model.

The telecommunication control unit 23 controls telecommunication with other nodes by way of the fixed line telecommunication interface 24 and LAN cable 11.

The wireless telecommunication interface 26 comprises a wireless telecommunication circuit for accomplishing a wireless telecommunication with a wireless terminal 40 and carries out processing of the physical layer of the OSI reference model.

The telecommunication control unit 25 carries out processing of the physical layer of the OSI reference model and controls a telecommunication when carrying out a wireless telecommunication with a wireless terminal 40, i.e., other node, by way of the wireless telecommunication interface 26.

The wireless terminal information storage unit 27 stores information about a wireless terminal 40 in communication with the access point 20 itself. The telecommunication control unit 25 refers to the information stored by the wireless terminal information storage unit 27, thereby managing the wireless terminal 40 as the telecommunication corresponding.

The transmission processing unit 21 carries out transmission processing of the data link layer of the OSI reference model and controls an information & telecommunication path between a wireless network constituted by one or a plurality of wireless terminals 40 which are connected to the wireless telecommunication interface 26 by way of a wireless telecommunication and a fixed line network on the side of the LAN cable 11 which is connected by the fixed line telecommunication interface 24.

As exemplified by FIG. 4, the wireless terminal 40 according to the present embodiment includes an upper layer protocol processing unit 41, a data packet processing unit 42, a telecommunication control unit 43, a wireless telecommunication interface 44 and an access point notification processing unit 45.

The functions of the respective units of the wireless terminal 40 are accomplished by software or firmware executed by a computer or by computer hardware.

The wireless telecommunication interface 44, comprising a wireless telecommunication circuit for accomplishing wireless telecommunication with the access points 20, carries out a processing of the physical layer of the OSI reference model.

The telecommunication control unit 43 carries out processing of the data link layer of the OSI reference model and controls telecommunication with another node.

The data packet processing unit 42 carries out the processing equivalent to the network layer and transport layer of the OSI reference model, thereby controlling an assembly of telecommunication data and an exchange of data with the upper layer protocol processing unit 41.

The upper layer protocol processing unit 41 is an application program for carrying out a processing equivalent to the session layer, presentation layer or application layer of the OSI reference model.

The access point notification processing unit 45, being furnished as a part of the upper layer protocol processing unit 41, sets information about access points 20 detected by the aforementioned wireless terminal 40 as communicable in a later described access point notification message 50 and transmits it to the management apparatus 30 by way of one access point 20.

Figure 5:
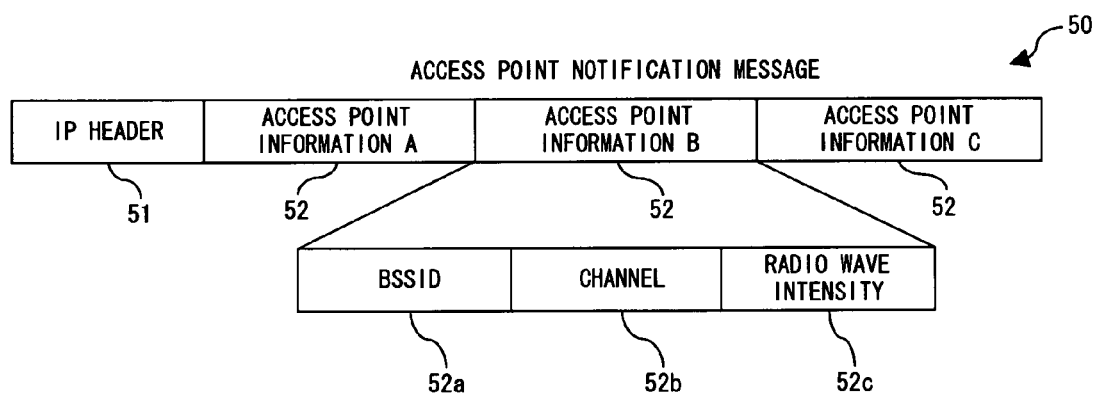
FIG. 5 is a conceptual diagram showing an example of an access point notification message used in a wireless LAN system as an embodiment of the present invention.

FIG. 5 shows an example of an access point notification message 50 which is created by the access point notification processing unit 45 comprised by the wireless terminal 40 for notifying the management apparatus 30. The access point notification message 50 includes an IP header 51 storing address information of an IP (Internet Protocol) communication, etcetera, and a number of access point information 52 equal to the number of access points 20 detected by the aforementioned wireless terminal 40.

The IP header 51 is information added to the access point information 52 by the data packet processing unit 42.

The access point information 52 is information created by the access point notification processing unit 45. Each piece of the access point information 52 contains information, i.e., a BSSID 52a, channel 52b and radio wave intensity 52c.

The BSSID 52a is identifier information such as a BSSID (basic service set identification) (MAC address) for identifying an access point 20, et cetera.

The channel 52b is a channel number used by an access point 20 for a wireless telecommunication with a wireless terminal 40.

The radio wave intensity 52c is the intensity of a radio wave received from each of the access points 20, detected by the wireless terminal 40.

Figure 6:
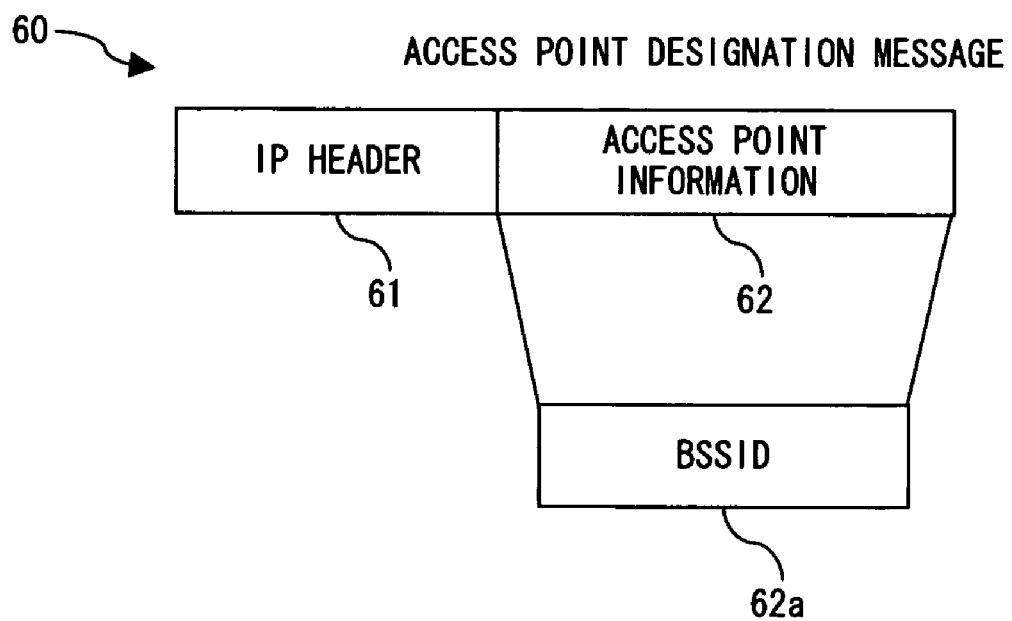
FIG. 6 is a conceptual diagram showing an example of an access point designation message used in a wireless LAN system as an embodiment of the present invention.

FIG. 6 shows a configuration example of an access point designation message 60 from the management apparatus 30 to notify the wireless terminal 40.

The access point designation message 60 comprises an IP header 61 storing address information about an IP telecommunication, et cetera, and access point information 62.

The access point information 62 is information created by the access point designation processing unit 31a and message processing unit 31b, while the IP header 61 is information added to the access point information 62 by the data packet processing unit 32.

In the present embodiment, the access point information 62 comprises identifier information such as a BSSID 62a (i.e., the MAC address of an access point 20) for identifying an access point 20 to be connected to by a wireless terminal 40.

FIG. 7 shows a configuration example of information retained by the access point information storage unit 35 for use by the management apparatus 30 according to the present embodiment.

The access point information-storage unit 35 stores an index 35a, BSSID 35b, IP address 35c, channel 35d, the number of connected terminals 35e, the number of connectable terminals 35f with the aforementioned items being correlated for each BSSID 35b which identifies each of the access points 20.

The index 35a is an identifier number for identifying each entry corresponding to a BSSID 35b.

The BSSID 35b is identifier information (i.e., MAC address) for identifying each of a plurality of access points under the management of the management apparatus 30.

The IP address 35c is an individual access point 20 Internet IP address.

The channel number 35d is a channel number used by an access point 20 corresponding to the current BSSID 35b for a wireless telecommunication with a wireless terminal 40.

The number of connected terminals 35e is the number of wireless terminals 40 currently connected to the current access point 20.

The number of connectable terminals 35f is the number of wireless terminals 40 remaining to be connected to the current access point 20.

Figure 8:
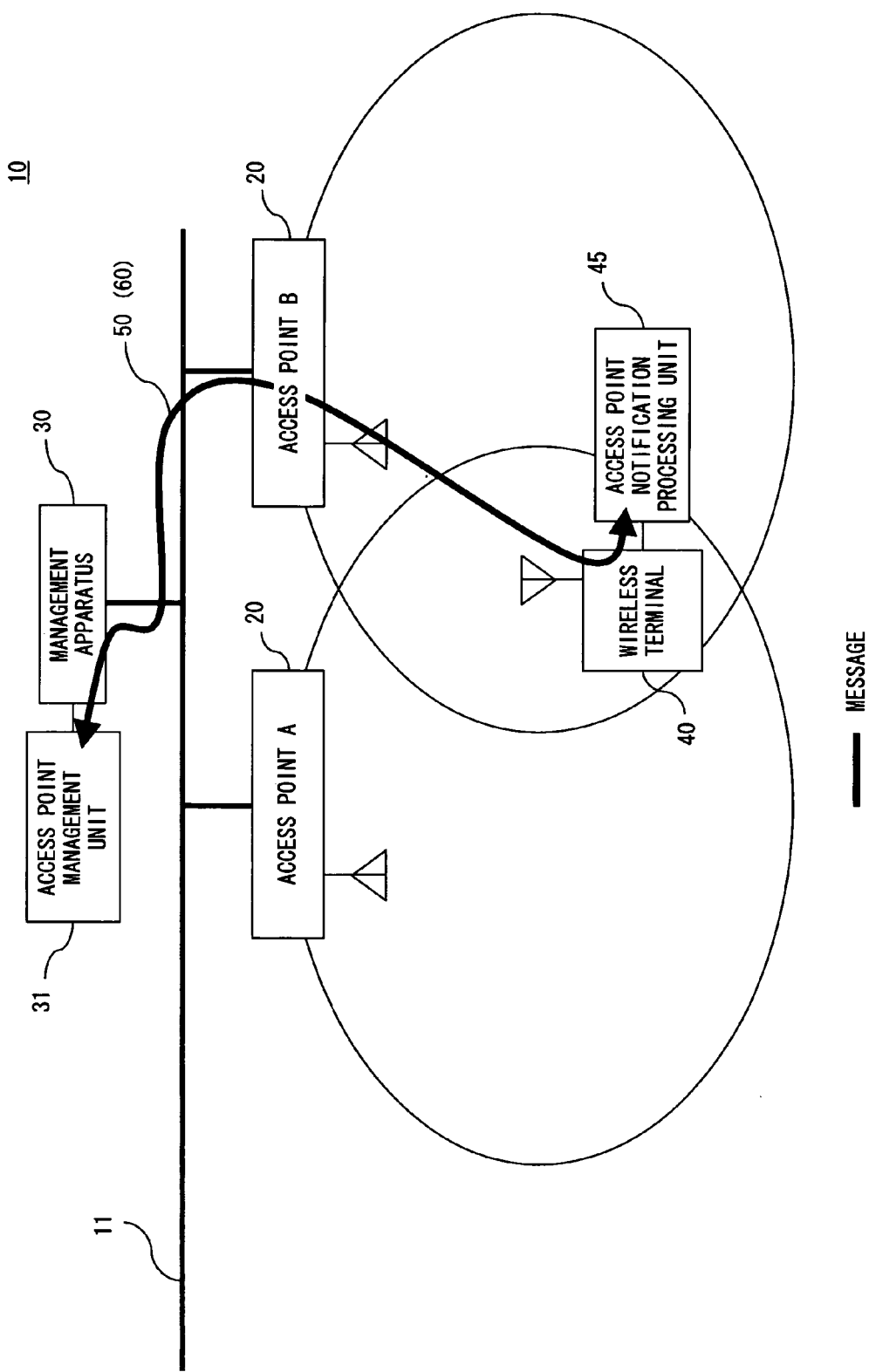
FIG. 8 is a conceptual diagram showing an operation example of a wireless LAN system as an embodiment of the present invention.

The following description is of an example operation of the present embodiment. As exemplified by FIG. 8, the wireless LAN system 10 according to the present embodiment is configured to install a management apparatus 30 within the wireless LAN system 10 for managing all the access points 20 existing therein so that the management apparatus 30 determines an access point 20 as the connection destination of each of the wireless terminals 40.

Each of the wireless terminals 40 notifies the management apparatus 30 of identifier information (i.e., an SSID, BSSID, et cetera) of the recognized access points 20 nearby, or the identifier information and radio wave information (i.e., channels, radio wave intensities, etcetera) of the access points 20, collectively as a access point notification message 50 by way of one of the recognized access points 20 when using the wireless LAN system 10 so that the management apparatus 30 determines an access point 20 as the connection destination for the wireless terminal 40 from the information about the access points 20 of the notification and instructs the wireless terminal 40 by way of an access point designation message 60.

Figure 11:
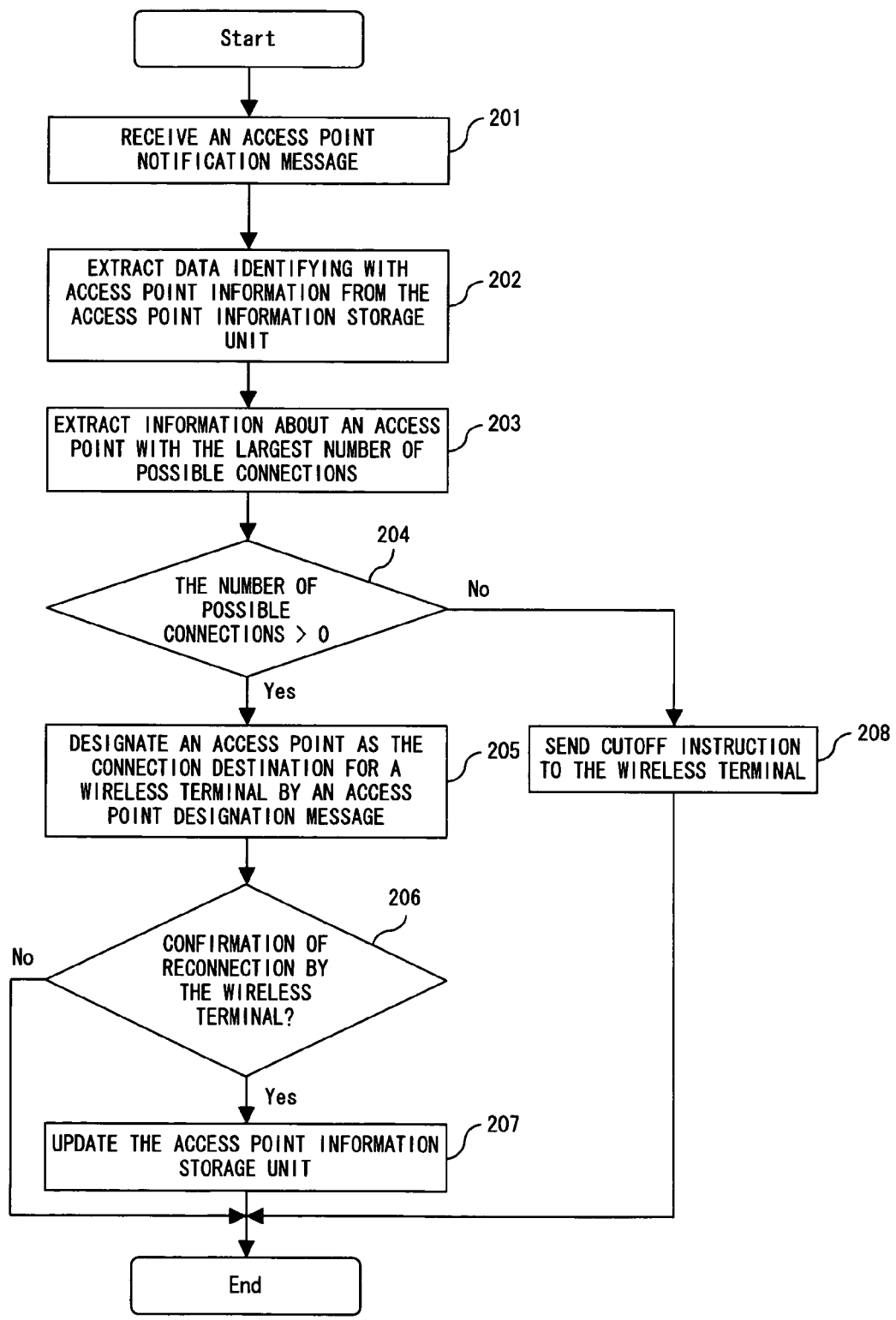
FIG. 11 is a flow chart exemplifying an operation of a management apparatus constituting a wireless LAN system as an embodiment of the present invention.

FIG. 9 is a sequence chart exemplifying a connection sequence in the wireless LAN system 10 according to the present embodiment; and FIGS. 10 and 11 are flow charts exemplifying respective operations of the wireless terminal 40 and management apparatus 30 in the connection sequence.

Note that FIG. 9 shows common step numbers between FIGS. 10 and 11 for the processing corresponding to FIGS. 10 and 11 as appropriate.

The following shows the operation for determining an access point 20 as the connection destination when a wireless terminal 40 uses the wireless LAN system 10.

[S1] When using the wireless LAN system 10, the wireless terminal 40 detects access points in the neighboring area by monitoring (i.e., a passive scan), or probe request/response (i.e., an active scan) (N.B.: FIG. 9 exemplifies a passive scan by monitoring beacons) of beacons sent out from access points in the neighboring area (step 102), and extracts an access point suitable for a connection from among the detected access points (step 111). The details of the extraction processing will be described by referring to FIG. 10.

[S2] The wireless terminal 40 connects itself to one of the extracted access point 20 (step 105).

[S3] Then notifies the management apparatus 30 existing within the wireless LAN system 10 of an access point notification message 50 including information relating to the extracted access points 20.

[S4] The management apparatus 30 collates the information in the notification of the access point notification message 50 in the [S3] with the information about the access points 20 stored by the access point information storage unit 35 and selects an access point 20 as the connection destination for the wireless terminal 40. The selection processing will be described later by referring to FIG. 11.

[S5] Then the management apparatus 30 notifies the wireless terminal 40 of the access point designation message 60 containing identifier information of the access point 20 selected in the [S4], thereby designating an access point 20 as the connection destination (step 205).

[S6] The wireless terminal 40 reconnects itself to the designated access point 20 (step 108).

FIG. 10 exemplifies a process flow until the wireless terminal 40 transmits the access point notification message 50 containing information about an access point 20.

The wireless terminal 40 recognizes the existence of an access point of a channel by monitoring beacons (i.e., a passive scan) or a probe request/response (i.e., an active scan) while switching from one channel to another between the minimum and maximum values of the channel. At the same time, the wireless terminal 40 measures radio wave intensities of respective access points 20, extracts the access points with the value thereof being at or greater than a certain suitable value and stores the BSSID, channel and radio wave intensity which relate to each access point 20 as access point information 52.

That is, the wireless terminal 40, following setting a channel used for a wireless telecommunication with an access point 20 at the minimum value (step 101), carries out a passive or active scan of the current channel (step 102), judges whether or not the existence of an access point 20 can be detected (step 103) and, if not detected, judges whether or not the channel number has exceeded the maximum value of the usable range (step 104) and, if it has not been exceeded, increases the channel number by one (step 109) followed by repeating the above described step 102 and steps thereafter.

If an access point 20 is detected in the above described step 103, judges whether or not the radio wave intensity of the aforementioned access point 20 is larger than a predetermined suitable value (step 110) and, if it is larger, stores the BSSID, channel and radio wave intensity as the BSSID 52a, channel 52b and radio wave intensity 52c, respectively, which relate to the aforementioned access point 20, in the access point information 52.

If the above described step 104 judges that the channel number has exceeded the maximum usable number, the wireless terminal 40 connects itself to one of the extracted access points 20 (step 105) and notifies the management apparatus 30 of the access point notification message 50 containing information such as the BSSID, channel and radio wave intensity relating to each of the extracted access points 20 (step 106).

Then, the wireless terminal 40 waits for an instruction from the management apparatus 30 (step 107), connects itself to a designated access point 20 anew if the aforementioned instruction is for designating an access point 20 as the connection destination and starts the desired information communication in the wireless LAN system 10 (step 108).

If there is an instruction from the management apparatus 30 for cutting off the connection in the step 107, the wireless terminal 40 carries out a prescribed cutoff processing with an access point 20 which has been connected for transmitting an access point notification message 50 (step 112).

FIG. 11 is a flow chart exemplifying an operation of a management apparatus 30 designating an access point 20 to a current wireless terminal 40 as the connection destination when receiving an access point notification message 50 from the current wireless terminal 40.

The management apparatus 30, when receiving an access point notification message 50 from a wireless terminal 40 (step 201), reads out information identifying access points 20 from the access point information storage unit 35 (step 202), further selects an access point 20 with the largest number of wireless terminals that can be connected thereto from among the access points 20, that is, an access point 20 having the most capacity among a plurality of access points 20 connectable for the wireless terminal 40 (step 203). This selection makes it possible to avoid a concentrated load due to a concentrated connection of a large number of wireless terminals 40 to a specific access point 20.

Here, if the number of connectable access points 20 selected in the step 203 is zero ("0") (step 204), the management apparatus 30 instructs the wireless terminal 40 to cut off the wireless LAN system 10 because none of the access points 20 can accommodate the wireless terminal 40 (step 208).

If the step 204 judges that the number of possible connections is larger than zero ("0"), the management apparatus 30 notifies the wireless terminal 40 of an access point designation message 60 containing identifier information about the access point 20 selected in the step 203 and issues instructions for reconnection to the selected current access point 20 (step 205).

The above is followed by confirming whether or not the wireless terminal 40 actually reconnected itself to the designated access point 20 (step 206) and, if the reconnection is confirmed, updating the content of the access point information storage unit 35 (step 207). If a reconnection is not confirmed, an updating of the access point information storage unit 35 is not carried out.

As described above, the present embodiment is configured to compile, as an access point notification message 50, information about a plurality of access points 20 in the neighborhood recognized by a arbitrary wireless terminal 40, transmit the aforementioned access point notification message 50 to the management apparatus 30 and request a connection to the wireless LAN system 10, thereby accomplishing an equitable load distribution for the access points 20 managed by the management apparatus 30.

Because of this, a waste of wireless resources between the wireless terminals 40 and access points 20 is suppressed as compared to the conventional case where connection requests for a wireless LAN system 10 are transmitted to a management apparatus 30 randomly by way of all the recognized access points 20.

Also, in the case of the present embodiment, once referring to an access point notification message 50 transmitted from a wireless terminal 40, the management apparatus 30 can identify a plurality of access points 20 available for the aforementioned wireless terminal 40 at once.

By this configuration, a wait time for queuing up all connection requests coming in, one after another, from one wireless terminal 40 by way of all the recognized access points 20 and cumbersome processing such as determining one access point 20 by limiting a maximum waiting time, as with the conventional technique, are now completely eliminated.

As a result, the management apparatus 30 according to the present embodiment is capable of promptly determining to which access point 20 the wireless terminal 40 that has requested a connection to the wireless LAN system 10 is to be connected.

That is, the present embodiment is capable of avoiding a concentrated connection to a specific access point 20 by the management apparatus 30 designating an access point 20 with a large number of available connections as the connection destination, and determining an access point as the connection destination for the wireless terminal 40 quickly without wasting the wireless resources in a plurality of access points 20.

Second Embodiment

The next description is of the case of determining an access point 20 as the connection destination for the aforementioned wireless terminal 40 in a certification process for the aforementioned wireless terminal 40 to be connected to a wireless LAN system 10 as the second embodiment thereof according to the present embodiment.

Figure 12:
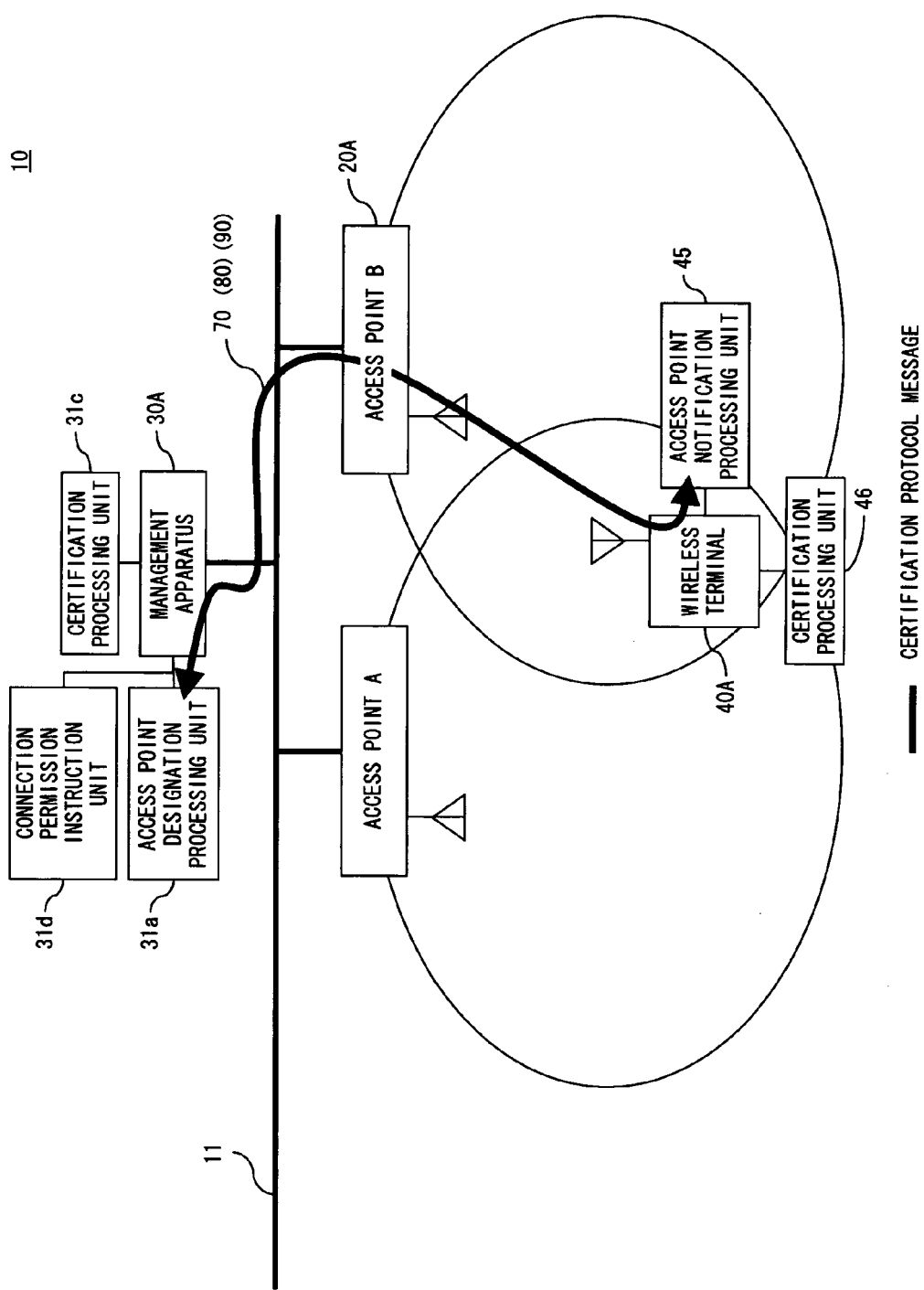
FIG. 12 is a conceptual diagram exemplifying an overall configuration and operation of a wireless LAN system as another embodiment of the present invention.

FIG. 12 is a conceptual diagram exemplifying an overall configuration of a wireless LAN system according to the second embodiment.

In the case of the present embodiment, a wireless terminal 40A adds identifier information about recognized neighboring access points 20A, or the identifier information and radio wave information about the access points 20A, to a certification protocol message (i.e., a later described access point notification message 70) and notifies the management apparatus 30A. The management apparatus 30A certifies the wireless terminal 40A and, only if the wireless terminal 40A is judged as legitimate, determines an access point 20A as the connection destination from the information about the access point 20A of the notification and designates an access point 20A by using a certification protocol message (i.e., a later described access point designation message 80). And the management apparatus 30A indicates the access point 20A as the connection destination to give permission to connect the wireless terminal 40A by using a later described connection permission instruction message 90.

In this case, the management apparatus 30A can conceivably be a certification apparatus such as a RADIUS (remote authentication dial in user service) server which carries out connection certification for a wireless terminal 40A in a wireless LAN system 10 for example.

Figure 13:
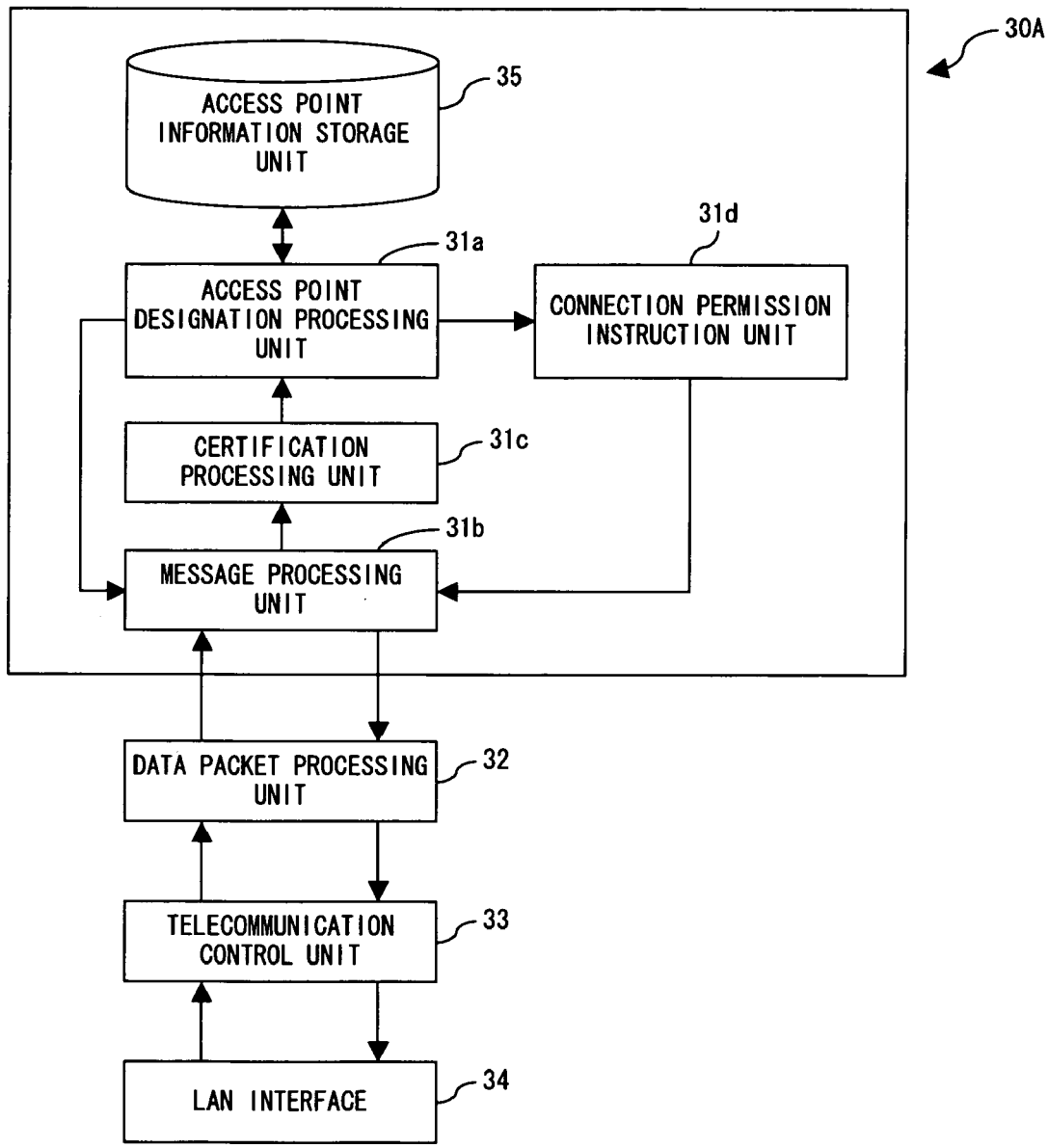
FIG. 13 is a conceptual diagram showing a configuration example of a management apparatus constituting a wireless LAN system as another embodiment of the present invention.

FIG. 13 is a conceptual diagram showing a configuration example of the management apparatus 30A, which is the same as the configuration of the first embodiment shown by FIG. 2, the only difference being the access point management unit 31 further comprising a certification processing unit 31c and a connection permission instruction unit 31d.

The certification processing unit 31c carries out the processes of certifying a wireless terminal 40 as a transmitter based on a later described access point notification message 70 from the wireless terminal 40 and notifying an access point designation processing unit 31a of the certification result.

The connection permission instruction unit 31d carries out the processes of creating the later described access point designation message 80 and connection permission instruction message 90.

That is, access point designation processing unit 31a executes a selection processing of the above described access point 20A only for a wireless terminal 40 successfully certified by the certification processing unit 31c.

The selection result is transmitted to the connection permission instruction unit 31d in which the selection result information is stored in the respective parts of the access point designation message 80 and connection permission instruction message 90.

Figure 14:
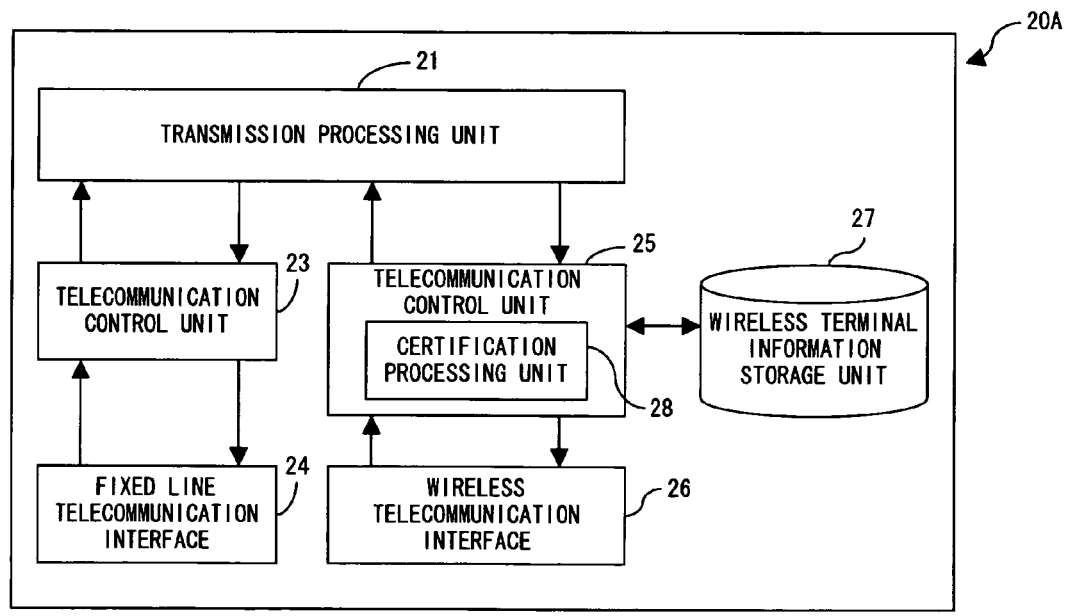
FIG. 14 is a conceptual diagram showing a configuration example of an access point constituting a wireless LAN system as another embodiment of the present invention.

FIG. 14 is a conceptual diagram showing a configuration example of the access point 20A according to the second embodiment.

The access point 20A is the same as the above described first embodiment shown by FIG. 3, the only difference being in the configuration and processing where a certification processing unit 28 is equipped in a part of the telecommunication control unit 25 for carrying out a certification processing for a wireless terminal 40 and a transmission processing unit 21 carries out a relay processing of a certification protocol message between the wireless terminal 40 and management apparatus 30.

The certification processing unit 28 carries out a security processing in a wireless telecommunication with a wireless terminal 40 based on information contained by a later described connection permission instruction message 90 received from the management apparatus 30.

FIG. 15 is a conceptual diagram showing a configuration example of a wireless terminal 40A according to the second embodiment. The wireless terminal 40A has the same configuration as that of the above described first embodiment shown by FIG. 4, the only difference therefrom being the telecommunication control unit 43 comprising an access point notification processing unit 45 and a certification processing unit 46.

The access point notification processing unit 45 carries out a processing of creating a later described access point notification message 70 within a layer (i.e., the data link layer) of the telecommunication control unit 43.

The certification processing unit 46 similarly carries out a certification processing within a layer (i.e., the data link layer) of the telecommunication control unit 43.

Figure 16:
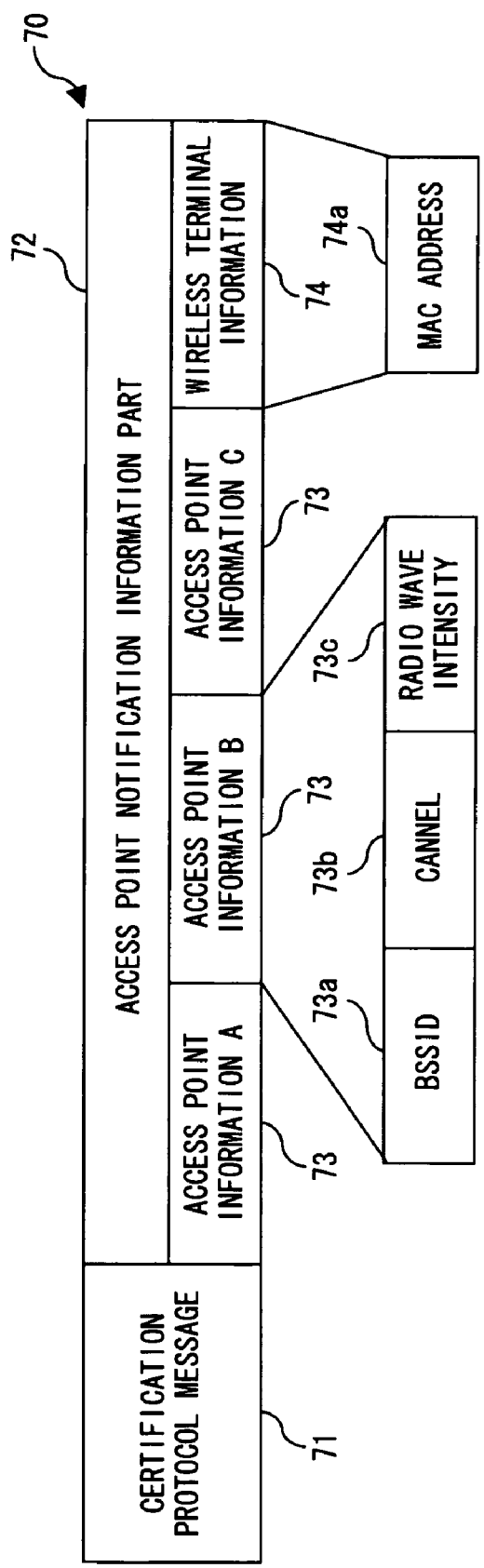
FIG. 16 is a conceptual diagram showing a configuration example of an access point notification message used in a wireless LAN system as another embodiment of the present invention.

FIG. 16 is a conceptual diagram showing a configuration example of an access point notification message 70 transmitted from the wireless terminal 40A to the management apparatus 30A.

The access point notification message 70 contains a certification protocol message 71 and an access point notification information part 72.

The certification protocol message 71, created by the certification processing unit 46 comprised by the wireless terminal 40, contains certification information processed by the certification processing unit 31c comprised by the management apparatus 30A.

The access point notification information part 72 contains access point information 73 corresponding to each of a plurality of wireless terminals 40A and wireless terminal information 74 for identifying a wireless terminal 40A of the transmitter of the aforementioned access point notification message 70.

Each piece of access point information 73 contains information such as a BSSID 73a (i.e., MAC address), channel 73b and radio wave intensity 73c, et cetera, which are related to each access point 20A recognized by the wireless terminal 40A.

The wireless terminal information 74 contains the MAC address 74a of the wireless terminal 40A of the transmitter of the aforementioned access point notification message 70. The MAC address 74a is a later described connection permission instruction message 90 and is used for the access point 20A identifying a wireless terminal 40A as the object of a connection.

Figure 17:
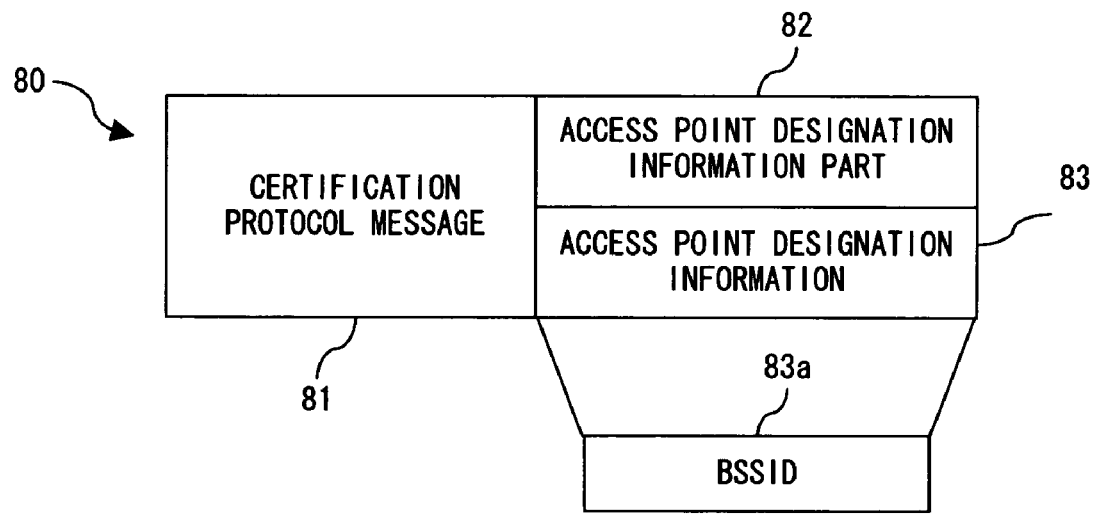
FIG. 17 is a conceptual diagram showing a configuration example of an access point designation message used in a wireless LAN system as another embodiment of the present invention.

FIG. 17 is a conceptual diagram showing a configuration example of an access point designation message 80 transmitted from the management apparatus 30A to the wireless terminal 40A.

The access point designation message 80 contains a certification protocol message 81 and an access point designation information part 82.

The certification protocol message 81 contains information such as a telecommunication encryption key allocated by the management apparatus 30A to a wireless terminal 40A, et cetera.

The access point designation information part 82 stores access point designation information 83 for identifying an access point 20A allocated to the wireless terminal 40A. The access point designation information 83 contains a BSSID 83a (i.e., the MAC address of an access point 20A) for example.

Figure 18:
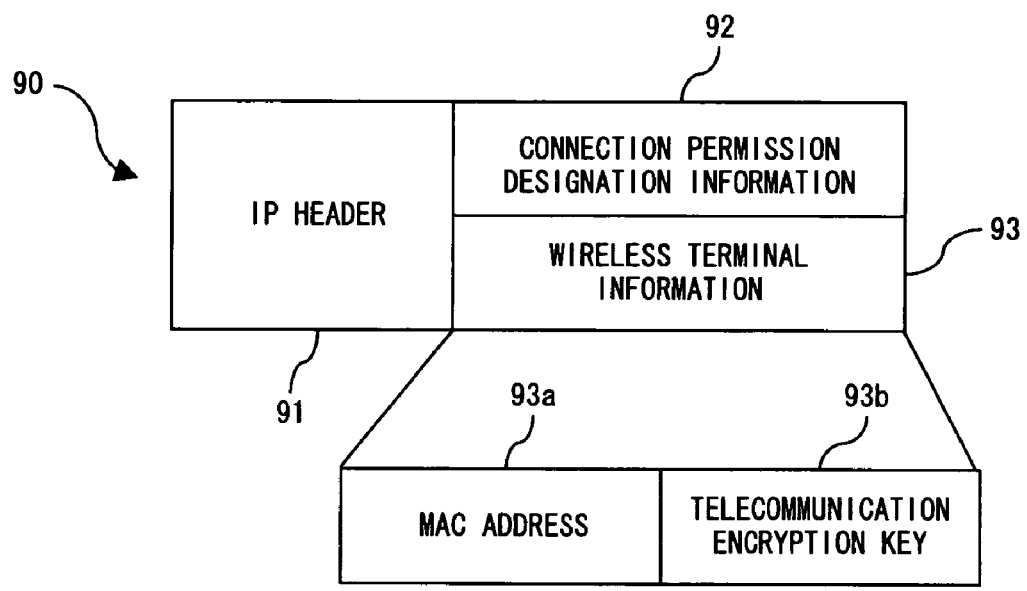
FIG. 18 is a conceptual diagram exemplifying a configuration of a connection permission designation message used in a wireless LAN system as another embodiment of the present invention.

FIG. 18 exemplifies a connection permission instruction message 90 transmitted for indicating a connection permission for a wireless terminal 40A from the management apparatus 30A to the access point 20A connected by a wireless terminal 40A.

The connection permission instruction message 90 is made up of an IP header 91 and connection permission designation information 92. The connection permission designation information 92 contains wireless terminal information 93 for identifying a wireless terminal 40A as the connection corresponding to an access point 20A.

The wireless terminal information 93 contains the MAC address 93a of a wireless terminal 40A and a telecommunication encryption key for carrying out an enciphered telecommunication between an access point 20A and the current wireless terminal 40A.

For instance, if a certification is successful by a certification such as EAP-TLS (extensible authentication protocol-transport layer security), the wireless terminal 40A is allocated by a telecommunication encryption key from the management apparatus 30A by the certification protocol message 81 included in the above described access point designation message 80.

Inserting a telecommunication encryption key 93b corresponding to the telecommunication encryption key provided to the wireless terminal 40A into the connection permission instruction message 90 from the management apparatus 30A to the access point 20A makes it possible to transfer to a telecommunication smoothly after the access point 20A connects the certified wireless terminal 40A.

FIG. 19 is a sequence chart exemplifying a connection sequence for a wireless terminal 40A connecting to an access point 20A according to the second embodiment. The difference from the first embodiment is that an access point notification processing of a wireless terminal 40A and an access point designation processing of the management apparatus 30A are carried out within a certification sequence. The following describes an example operation.

[S11] A wireless terminal 40A detects the neighboring access points 20A by monitoring beacon or probe request/response sent from the neighboring access points 20A and extracts an access point 20A suitable for connection from among the detected access points 20A when using the wireless LAN system 10.

[S12] The wireless terminal 40A requests the management apparatus 30A for certification by way of one of the extracted access points 20A.

[S13] Having received a certification request, the management apparatus 30A starts a certification of the wireless terminal 40A.

[S14] The wireless terminal 40A sets information relating to the access point 20A as the access point notification information part 72 in the access point notification message 70 containing the certification protocol message 71 and transmits it to the management apparatus 30A, thereby carrying out an access point notification processing in the certification processing with the management apparatus 30A.

[S15] The management apparatus 30A obtains the information of the access point notification information part 72 added to the access point notification message 70 and, if judged as a legitimate wireless terminal 40A, collates the obtained information of the access point notification information part 72 with the information about the access point 20A stored by the access point information storage unit 35, and thereby selects one access point 20A as the connection destination for the wireless terminal 40A.

[S16] Then the management apparatus 30A sets the identifier information about the access point 20A selected in the [S15] in the access point designation information part 82 of the access point designation message 80 and notifies the wireless terminal 40A, thereby designating an access point 20A as the connection destination.

In the case of the second embodiment, message exchanges are performed a few times for certification (i.e., the above described S12 and S13) between the wireless terminal 40A and management apparatus 30A, during which time either one of the messages carries out an access point notification processing from the wireless terminal 40A (i.e., by an access point notification message 70) and an access point designation processing from the management apparatus 30A (i.e., by an access point designation message 80).

[S17] Furthermore, the management apparatus 30A transmits a connection permission instruction message 90 to the selected access point 20A, thereby designating a connection permission for the wireless terminal 40A.

FIG. 20 exemplifies a processing flow chart until a wireless terminal 40A notifies a management apparatus of the information about an access point 20A.

The basic processing is the same as the first embodiment shown by FIG. 10, except that an access point notification to the management apparatus 30A utilizes a certification protocol message. In FIG. 20, the parts common with the above described FIG. 10 are assigned the same step numbers and duplicate descriptions are omitted here.

That is, in FIG. 20, the steps 121, 122 and 123 are carried out in place of the above described steps 105 and 106, shown by FIG. 10.

The step 121 creates an access point notification information part 72 containing identifier information about a plurality of access points 20A recognized by the wireless terminal 40A and constructs an access point notification message 70 from the access point notification information part 72 and certification protocol message 71.

The step 122 transmits the access point notification message 70 created by the step 121 to the management apparatus 30A.

And the step 123 is a processing for judging whether or not a certification of the wireless terminal 40A by the management apparatus 30A is successful and, if the certification thereof is successful, carries out the processing of step 107 and subsequent steps.

Figure 21:
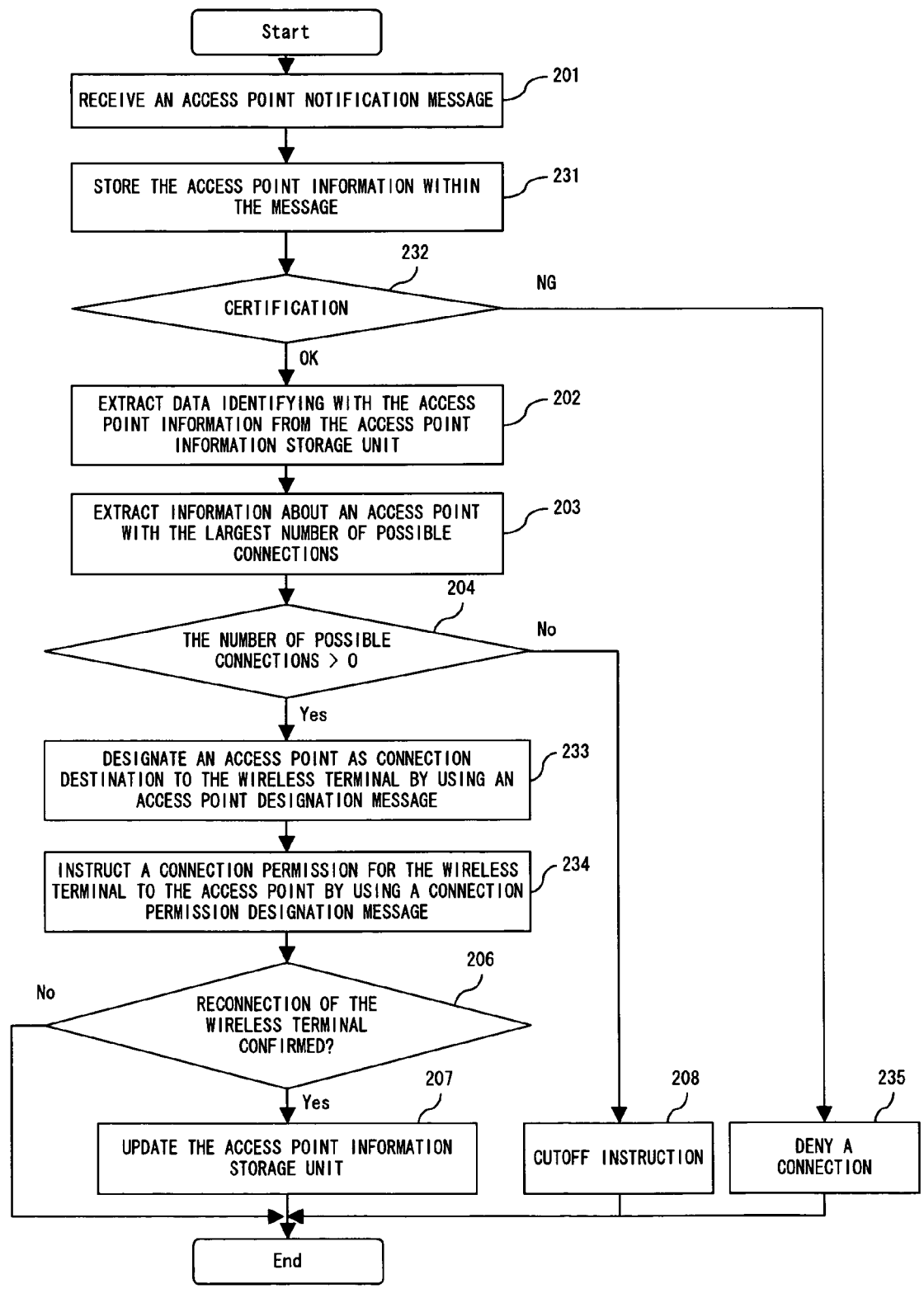
FIG. 21 is a flow chart exemplifying an operation of a management apparatus constituting a wireless LAN system as another embodiment of the present invention.

FIG. 21 exemplifies a processing flow chart of the management apparatus 30A, having received an access point notification message 70 from a wireless terminal 40A, designating an access point 20A to the wireless terminal 40A as the connection destination. Let the part different from the above described first embodiment shown by FIG. 11 be described, while assigning the same step numbers to common parts and omitting descriptions thereof.

The difference from the above described first embodiment shown by FIG. 11 lies in receiving an access point notification message 70 and carrying out a process of selecting an access point 20A only when the ensuing certification is successful (i.e., steps 231, 232 and 235). And a notification of the identifier information of the selected access point 20A is carried out by using an access point designation message 80 (step 233).

And when an access point 20A is selected, it is notified of the identifier information of the wireless terminal 40A to be connected, by using a connection permission instruction message 90, thereby designating the wireless terminal 40A a permission to connect (step 234).

The present embodiment is configured to simultaneously carry out the determination of an access point 20A as the connection destination and the certification of a wireless terminal 40A, and therefore the wireless terminal 40A is enabled to start utilizing the wireless LAN system 10 more quickly than in the case of the first embodiment.

It will be obvious that the present invention may be changed in various ways within the scope thereof and is not limited to the above described embodiment.

The present invention makes it possible to avoid a concentrated connection of wireless terminals to a specific access point when the wireless terminals utilize a wireless LAN system.

The present invention also makes it possible to determine an access point as the connection destination of a wireless terminal quickly while suppressing the consumption of wireless resources when connecting a wireless terminal to a wireless LAN.

<Additional Statement 1>

A wireless local area network system including a plurality of access points, a wireless terminal for carrying out a wireless telecommunication with the access points and a management apparatus for managing the access points, wherein
the wireless terminal includes an access point notification unit for notifying the management apparatus of connection request information, which includes at least either one of identifier information about each of a plurality of the access points recognized as being available for wireless telecommunication and radio wave information about the wireless telecommunication with the access points, by way of one of the access points; and the management apparatus includes an access point determination unit for designating, to a wireless terminal, the access point as the connection destination of the aforementioned wireless terminal, based on the connection request information coming from the wireless terminal.

<Additional Statement 2>

The wireless local area network system noted by the additional statement 1, wherein
said access point notification unit included by said wireless terminal carries out the steps of
detecting said access points in the neighboring area of the aforementioned wireless terminal by a radio wave monitor,
extracting one or more of the access points from among the detected access points, and
notifying said management apparatus of identifier information about the extracted access points, or the identifier information and radio wave information, by way of either one of the access points.

<Additional Statement 3>

The wireless local area network system noted by the additional statement 1, wherein
said access point notification unit included by said wireless terminal
sets, in said connection request information, said identifier information about said access point only with a radio wave intensity of a suitable value or greater from among the detected access points.

<Additional Statement 4>

The wireless local area network system noted by the additional statement 1, wherein
said management apparatus includes
an access point information storage unit for retaining management information relating to said access points within the wireless local area network system, such as the number of possible connections of said wireless terminal, channels used by the current access point, IP address thereof, et cetera; and
said access point determination unit carries out the steps of
selecting the access point as the connection destination of the wireless terminal by collating said connection request information coming therefrom with the information retained by the access point information storage unit, and
notifying the wireless terminal of the identifier information of the selected access point.

<Additional Statement 5>

The wireless local area network system noted by the additional statement 1, wherein
said access point determination unit included by said management apparatus selects said access point with a larger number of available connections of said wireless terminals from among the access points of which said identifier information is contained by said connection request information which is coming from the wireless terminal.

<Additional Statement 6>

A wireless local area network system including a plurality of access points, a wireless terminal for carrying out a wireless telecommunication with the access points and a management apparatus for managing the access points, wherein
the wireless terminal includes a certification request unit for requesting the management apparatus for connecting to the wireless local area network system, and an access point notification unit for notifying the management apparatus by adding, to a certification protocol message as connection request information, identifier information about the access points recognized being available for a wireless telecommunication and radio wave information about the wireless telecommunication with the access point; and the management apparatus includes a certification unit for certifying connection of the wireless terminal with the wireless local area network system, an access point determination unit for determining the access point as the connection destination of the wireless terminal from among the access points having the identifier information indicated by the connection request information and designating the access point by using the certification protocol message if the connection certification is successful according to the certification unit, and a connection permission designation unit for designating a connection permission to the wireless terminal to the access point.

<Additional Statement 7>

The wireless local area network system noted by the additional statement 6, wherein said access point notification unit carries out the steps of detecting said access points in the neighboring area of the aforementioned wireless terminal by a radio wave monitor, extracting one or more of the access points from among the detected access points, and notifying said management apparatus of identifier information about the extracted access points, or the identifier information and radio wave information, by adding to a certification protocol message by way of either one of the access points.

<Additional Statement 8>

The wireless local area network system noted by the additional statement 6, wherein said access point notification unit included by said wireless terminal sets, in said connection request information, identifier information about said access point with a radio wave intensity exceeding a suitable value from among the detected access points to add to said certification protocol message.

<Additional Statement 9>

The wireless local area network system noted by the additional statement 6, wherein said management apparatus includes an access point information storage unit for retaining management information relating to said access points within the wireless local area network system, such as the number of available connections of said access point, channels used by the current access point, IP address thereof, et cetera; and said access point determination unit carries out the steps of selecting the access point as the connection destination of the wireless terminal by collating said connection request information coming therefrom as a part of said certification protocol message with the information retained by the access point information storage unit, and notifying the wireless terminal of the identifier information about the selected access point as a part of the certification protocol message.

<Additional Statement 10>

The wireless local area network system noted by the additional statement 6, wherein said access point determination unit included by said management apparatus selects said access point with a larger number of available connections of said wireless terminals from among the access points of which said identifier information is contained by said connection request information which is coming from the wireless terminal.

<Additional Statement 11>

The wireless local area network system noted by the additional statement 6, wherein said connection permission instruction unit included by said management apparatus carries out a step of notifying said access point, which is determined as the connection destination of a current wireless terminal, of the identifier information about the wireless terminal permitted for certification and a telecommunication encryption key retained by the current wireless terminal.

What is claimed is:

1. A wireless terminal for communicating within a wireless local area network including a plurality of access points and a management apparatus that manages the access points, the wireless terminal comprising:

an access point notification unit to create connection request information, the connection request information including identifier information identifying each of a plurality of the access points recognized as communicable before establishment of a communication and radio wave information detected by the wireless terminal, the radio wave information being information about a radio wave received from each of the access points recognized as communicable before the establishment of a communication; and a transmitter unit to establish communication with any one of the access points and to transmit the connection request information to the management apparatus by way of the access point with which the communication is established.

2. The wireless terminal according to claim 1, wherein said identifier information includes an service set identifier (SSID) or a basic service set identifier (BSSID), and said radio wave information includes at least one of a channel used for wireless telecommunication with each of the access points or a radio wave intensity of the radio wave received from each of the access points.

3. The wireless terminal according to claim 1, further comprising:

a certification request unit to request, from said management apparatus, connecting to said wireless local area network, wherein said access point notification unit transmits, to the management apparatus, at least a part of a certification protocol message by adding said connection request information.

4. A management apparatus included within a wireless local area network together with a plurality of access points and a plurality of wireless terminals, the management apparatus comprising:

a storage unit to store access point information including identifier information about each of the access points and the number of the wireless terminals connectable to each of access points;

a receiving unit to receive, from a wireless terminal by way of one of the access points, connection request information having access point information which includes identifier information identifying each of a plurality of the access points recognized as communicable before establishment of a communication and radio wave information detected by the wireless terminal, the radio wave information being information about a radio wave received from each of the access points recognized as communicable before the establishment of a communication; and an access point determination unit to determine the lightest load access point of a plurality of the access points connectable with the wireless terminal based on the connection request information and the access point information stored in the storage unit and to notify the wireless terminal of the determined access point.

5. The management apparatus according to claim 4, wherein
said identifier information includes a service set identifier (SSID) or a basic service set identifier (BSSID), and
said radio wave information includes at least one of a channel used for wireless telecommunication with each of the access points or a radio wave intensity of the radio wave received from each of the access points.

6. The management apparatus according to claim 4, further comprising:
a certification unit to certify a connection of said wireless terminal to said wireless local area network, wherein
said access point determination unit accepts said connection request information from the wireless terminal and notifies said determined access point that the wireless terminal is to be connected in the process of a certification sequence for the wireless terminal carried out by the certification unit.

7. A method for a wireless terminal communicating within a wireless local area network including a plurality of access points and a management apparatus managing which of the access points the wireless terminal is to be connected, the communication method comprising:
creating connection request information including identifier information identifying each of a plurality of the access points recognized by the wireless terminal as communicable before establishment of a communication and radio wave information detected by the wireless terminal, the radio wave information being information about a radio wave received from each of the access points recognized as communicable before the establishment of a communication;
establishing communication with any one of the access points; and
transmitting the connection request information to the management apparatus, by way of the access point with which the communication is established, in order to establish a connection with an access point specified by the management apparatus based at least on the connection request.

8. The control method for a wireless local area network according to claim 7, wherein
said identifier information includes a service set identifier (SSID) or a basic service set identifier (BSSID), and
said radio wave information includes at least one of a channel used for wireless telecommunication with each of the access points or a radio wave intensity of the radio wave received from each of the access points.

9. The control method for a wireless local area network according to claim 7, wherein
said creating and transmitting are carried out as a part of a certification sequence for said wireless terminal.

10. The wireless terminal according to claim 1, wherein the connection request information is created and transmitted when the wireless terminal does not have an established connection with any of the plurality of access points.

11. The management apparatus according to claim 4, wherein the connection request information is created and transmitted by the wireless terminal when the wireless terminal has connection with none of the plurality of access points.

12. A control method for a wireless local area network including a plurality of access points performing a wireless telecommunication with one or more wireless terminals and a management apparatus managing which of the access points a wireless terminal is to be connected, the control method comprising:
receiving from a wireless terminal, by way of one of the access points, connection request information having access point information which includes identifier information identifying each of a plurality of the access points recognized as communicable with the wireless terminal before establishment of a communication and radio wave information detected by the wireless terminal, the radio wave information being information about a radio wave received from each of the access points recognized as communicable before the establishment of a communication;
selecting the lightest load access point of a plurality of the access points connectable with the wireless terminal based at least on the connection request information; and
notifying the wireless terminal of the selected access point.

13. The control method of claim 12, further comprising:
storing access point information including identifier information about each of the access points and the number of the wireless terminals connectable to each of access points; and wherein
the selecting is based on the connection request information and the access point information.

14. The control method of claim 12, wherein the connection request information is received from a wireless terminal that does not have an established connection with any of the plurality of access points.

15. The control method according to claim 12, wherein
said identifier information includes an service set identifier (SSID) or a basic service set identifier (BSSID), and
said radio wave information includes at least one of a channel used for wireless telecommunication with each of the access points or a radio wave intensity of the radio wave received from each of the access points.

16. The method according to claim 7, wherein connection request information is created and transmitted when the wireless terminal does not have an established connection with any of the plurality of access points.

17. The method according to claim 7, wherein
said identifier information includes an service set identifier (SSID) or a basic service set identifier (BSSID), and
said radio wave information includes at least one of a channel used for wireless telecommunication with each of the access points or a radio wave intensity of the radio wave received from each of the access points.

* * * * *